United States Patent
Fujii et al.

(10) Patent No.: US 12,229,020 B2
(45) Date of Patent: Feb. 18, 2025

(54) STORAGE SYSTEM AND METHOD OF RESTORING STORAGE SYSTEM

(71) Applicant: Hitachi, Ltd., Tokyo (JP)

(72) Inventors: Hiroki Fujii, Tokyo (JP); Masahiro Arai, Tokyo (JP); Akira Deguchi, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 3 days.

(21) Appl. No.: 18/178,977

(22) Filed: Mar. 6, 2023

(65) Prior Publication Data
US 2023/0393948 A1 Dec. 7, 2023

(30) Foreign Application Priority Data
Jun. 7, 2022 (JP) ................................. 2022-092162

(51) Int. Cl.
*G06F 11/14* (2006.01)
(52) U.S. Cl.
CPC ...... *G06F 11/1464* (2013.01); *G06F 11/1469* (2013.01); *G06F 2201/84* (2013.01)
(58) Field of Classification Search
CPC ... G06F 11/1464; G06F 11/14; G06F 11/1469
See application file for complete search history.

(56) References Cited

U.S. PATENT DOCUMENTS

| | | | | |
|---|---|---|---|---|
| 2004/0230954 | A1* | 11/2004 | Dandoy | G06F 11/3644 717/124 |
| 2012/0233424 | A1* | 9/2012 | Kakui | G06F 3/0665 711/E12.103 |
| 2013/0024635 | A1* | 1/2013 | Araki | G06F 3/065 711/E12.103 |
| 2017/0169038 | A1* | 6/2017 | Borate | G06F 16/1873 |
| 2017/0277443 | A1* | 9/2017 | Deguchi | G06F 11/2094 |

FOREIGN PATENT DOCUMENTS

JP 2018129074 A 8/2018

* cited by examiner

*Primary Examiner* — Kamini B Patel
(74) *Attorney, Agent, or Firm* — Volpe Koenig

(57) ABSTRACT

Acquiring a snapshot of a logical volume involves generating snapshot-related catalog information including at least a location for storing actual data in the snapshot and a reference destination for identifying another snapshot in parent-child relation to the snapshot, and storing the actual data in the snapshot to the physical storage device and/or to the cloud service. In a case where at least one of a plurality of snapshots is to be designated and restored, catalog information is referenced to identify the storage location of the actual data and acquire the actual data stored in the physical storage device and the actual data not stored in the physical storage device from the cloud service.

9 Claims, 25 Drawing Sheets

FIG. 7

| Volume LBA | P-VOL ADR | SS01 ADR | SS02 ADR |
|---|---|---|---|
| #1 | B03 | B00 | B03 |
| #2 | B04 | B01 | B01 |
| #3 | B02 | B02 | B02 |
| ... | ... | ... | ... |

FIG. 8A

REGISTERED STORE LIST

○ ams: test Backup
○ ABC Cloud: 2ndcopy

REGISTER NEW STORE

| | |
|---|---|
| Cloud Service | ams ▼ |
| Name | std Backup |

| | |
|---|---|
| Region | Asia-Tokyo ▼ |
| Access ID | AF37D7GDK |
| Secret Key | *************** |
| Bucket Name | *(Auto: VSP56342)* |
| Encryption | ⦿ SSE  ○ KMS  ○ SSE-C |

[ Tag ]   [ OK ]   [ Cancel ]

FIG. 12

OBJ Key: VSP56342-v7f-s02.meta  T150

| Bitmap Size | 400,000,000B | T1510 |
| Bitmap | 110011011101101101011110111110100000010 10101011010110101010101110101010110b..... | T1511 |
| Data OBJKey0 | VP56342-v7f-s02-obj001.dat | T1520 |
| Length | 64,64,64,64,64,64,... | T1521 |
| Data OBJKey1 | VSP56342-v7f-s02-obj002.dat | T1530 |
| Length | ... | T1531 |
| OBJKey2 | ... | T1540 |
| Length | ... | T1541 |

FIG. 13A

VSP564342-v7f-s02.catalog T160

| DEVICE PRODUCT NO. | VSP56342 | T1610 |
| BACKUP VOLUME NO. | 0x7f | T1611 |
| USED SIZE AND PROVISIONING SIZE OF Volume | 12.8TB/16.0TB | T1612 |
| Snapshot GENERATION NO. | 02 | T1613 |
| DATE AND TIME OF Snapshot ACQUISITION | 2021-04-28 21:00:17 | T1614 |
| METADATA OBJ Key | VSP56342-v7f-s02.meta | T1615 |
| PARENT CATALOG OBJ Key | VSP56342-v7f-s01.catalog | T1616 |

FIG. 13B

VSP56342-v7f-s01.catalog T170

| DEVICE PRODUCT NO. | VSP56342 | T1710 |
| BACKUP Volume NO. | 0x7f | T1711 |
| ACTUALLY USED SIZE AND PROVISIONING SIZE OF Volume | 11.5TB/16.0TB | T1712 |
| Snapshot GENERATION NO. | 01 | T1713 |
| DATE AND TIME OF Snapshot ACQUISITION | 2021-04-28 18:00:14 | T1714 |
| METADATA OBJ Key | VSP56342-v7f-s01.meta | T1715 |
| PARENT CATALOG OBJ Key | - | T1716 |

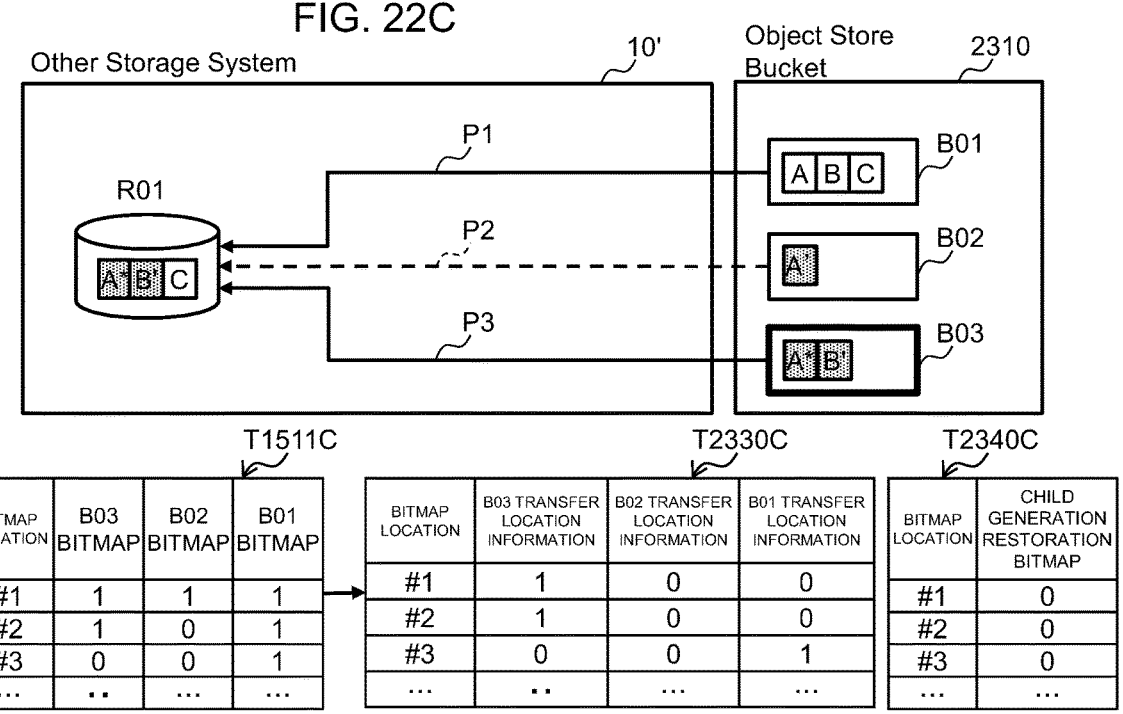
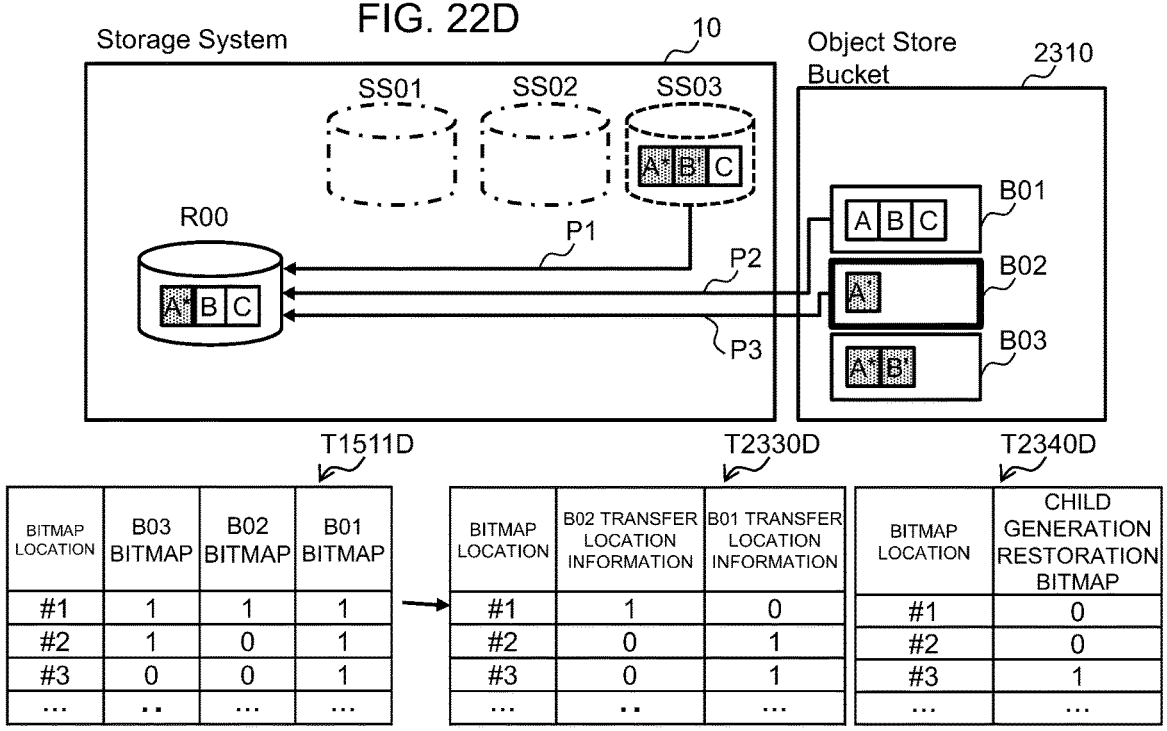

FIG. 23

| Key | DEVICE PRODUCT NO. | BACKUP VOLUME NO. | USED SIZE AND PROVISIONING SIZE OF Volume | Snapshot GENERATION NO. | DATE AND TIME OF Snapshot ACQUISITION | METADATA OBJ Key | PARENT CATALOG Key |
|---|---|---|---|---|---|---|---|
| VSP564342-v7f-s01 | VSP56342 | 0x7f | (12.8, 16.0) | 01 | 2021-04-28 18:00:14 | VSP56342-v7f-s01.meta | (null) |
| VSP564342-v7f-s02 | VSP56342 | 0x7f | (12.8, 16.0) | 02 | 2021-04-28 21:00:17 | VSP56342-v7f-s02.meta | VSP564342-v7f-s01 |
| ... | ... | ... | ... | ... | ... | ... | ... |
| ... | ... | ... | ... | ... | ... | ... | ... |

T1000

STORAGE SYSTEM AND METHOD OF RESTORING STORAGE SYSTEM

BACKGROUND OF THE INVENTION

1. Field of the Invention

The present invention relates to a storage system and a method of restoring the storage system.

2. Description of the Related Art

Recent years have seen the emergence of an operation mode called a hybrid cloud that permits the use of on-premise information technology (IT) resources and public cloud services in combination depending on cost and purpose. In terms of storage, on-premise equipment allows for high-speed input/output (I/O) access but is subject to high bit cost, which requires prior capacity design. By contrast, the cloud services are under the constraints of distance and communication bands for performance, but entail low bit cost and have no need for prior capacity design. Representative of this type of service is the object store service that stores data in object form and permits access thereto through representational state transfer application programming interface (REST API). The object store permits the use of a practically unlimited capacity and hence requires no prior capacity design. Furthermore, the object store service involves lower bit cost than other cloud storage services.

One use of the object store may be as a backup of an on-premise storage apparatus. With regard to the uses of the object store, JP-2018-129074-A states that "The object store saves the capacity of the on-premise storage apparatus, provides fast access performance of the on-premise storage apparatus, and, if there occurs a failure of on-premise resources, resumes business accurately and swiftly by using data in a cloud" and that "The processor offers a first volume as a virtual volume, and establishes a copy pair of a combination of the first volume and a second volume provided by another storage system. The write data to the first volume is transferred to the second volume via a network as per the copy pair. The processor writes to a memory a portion of the data written to the second volume, and writes the data written in the memory to a storage device."

SUMMARY OF THE INVENTION

In the case where the existing techniques are used for the cloud backup, however, there is the problem of having to transfer large amounts of data at the time of restore. To restore incrementally backed-up data requires restoring the data item by item chronologically from previous generations. That is because the data, once backed up, will not be included in another generation. It follows that if the backup were continued in this manner, a hundredth backup would accumulate the data of 100 generations, which must be restored sequentially at the time of restore.

It is therefore an object of the present invention to reduce the amount of data transfer at the time of data restoration from a cloud.

In achieving the foregoing and other objects of the present invention and according to one representative embodiment thereof, there is provided a storage system including a physical storage device, a processor configured to provide a logical volume configured by use of a storage region in the physical storage device, and a network interface configured to connect with a cloud service that provides storage. The processor has a function to acquire a snapshot of the logical volume. The snapshot acquisition involves generating snapshot-related catalog information including at least a location for storing actual data in the snapshot and a reference destination for identifying another snapshot in parent-child relation to the snapshot, and storing the actual data in the snapshot to the physical storage device and/or to the cloud service. When one of the plurality of snapshots is to be designated and restored, the processor references the catalog information to identify the storage location of the actual data and acquire the actual data stored in the physical storage device and the actual data not stored in the physical storage device from the cloud service.

According to another representative embodiment of the present invention, there is provided a method of restoring a storage system having a processor that provides a logical volume configured by use of a storage region in a physical storage device. The method includes the steps of, when a snapshot of the logical volume is to be acquired, causing the processor to generate snapshot-related catalog information including at least a location for storing actual data in the snapshot and a reference destination for identifying another snapshot in parent-child relation to the snapshot, causing the processor to store the actual data in the snapshot to the physical storage device and/or to the cloud service, and, when one of the plurality of snapshots is to be designated and restored, causing the processor to reference the catalog information to identify the storage location of the actual data and acquire the actual data stored in the physical storage device and the actual data not stored in the physical storage device from the cloud service.

The present invention thus reduces the amount of data transfer at the time of data restoration from a cloud. The foregoing and other objects, structures, and advantages of the present invention will become evident from a reading of the following detailed description of preferred embodiments.

BRIEF DESCRIPTION OF THE DRAWINGS

FIG. 7 is a tabular view indicating the state of a mapping table at the time of acquiring the snapshots in FIG. 6 in conjunction with the embodiment of the invention;

FIGS. 8A and 8B are schematic diagrams depicting an object store registration screen of the storage system embodying the invention;

FIG. 12 is a tabular view indicating a structure of metadata in the backup process performed by the embodiment of the invention;

FIGS. 13A and 13B are tabular views indicating catalog data stored into the object store in the backup process performed by the embodiment of the invention;

FIG. 23 is a tabular view indicating how the embodiment records catalog data by use of a Not only structured query language (NoSQL) database provided by a database service.

DESCRIPTION OF THE PREFERRED EMBODIMENTS

Figure 1:
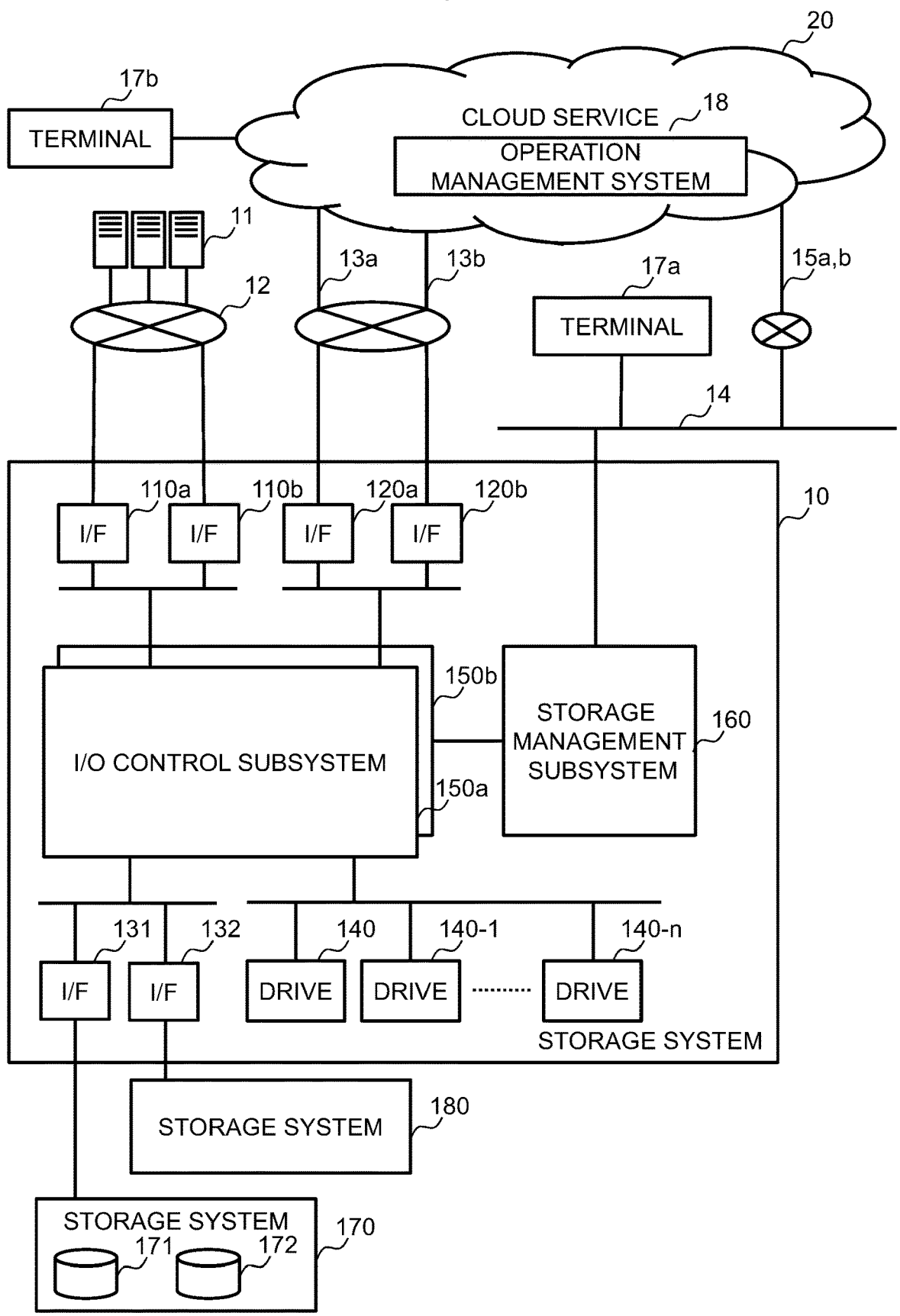
FIG. 1 is a schematic diagram depicting a connection relation between a storage system embodying the present invention on one hand and a cloud service providing an object store on the other hand, along with a configuration overview of the setup involved.

Embodiments of the present invention will now be described with reference to the accompanying drawings.

Although information may be described hereunder using the expression "XXX table," the information may be expressed in any other data structure. That is, in order to indicate that given information is not dependent on data structure, the expression "XXX table" can be reworded as "XXX information." Also, in the ensuing description, the structure of each table is only an example; one table may be divided into two or more tables, and two or more tables may be integrated into a single table.

In the description that follows, identifications (IDs) are used as the identification information identifying elements. Alternatively, or additionally, other types of identification information may be used.

Where elements of the same type are described below without distinction therebetween, the elements may be referred to by use of reference signs assigned thereto or a common number in the reference signs. Where elements of the same type are described below as distinct from each other, the elements may be referred to using their reference signs or IDs assigned to the elements instead of the reference signs.

Also, in the description that follows, I/O requests signify write or read requests. The I/O requests may alternatively be called access requests.

In the description that follows, there will be cases where processes are explained using "program(s)" as the subject of a process. Since the program is executed by a processor (e.g., central processing unit (CPU)) to perform a predetermined process with use of storage resources (e.g., memory) and/or an interface device (e.g., communication port) as needed, the processor may also be regarded as the subject of the process. A process explained using the program as the subject may be considered a process or a system carried out by the processor or by an apparatus having the processor. The processor may include hardware circuits that perform part or all of the process. The programs may be installed into such equipment as a computer from program sources. The program sources may be storage media that can be read by program distribution servers or by computers. In the case where the program source is a program distribution server, that program distribution server includes the processor (e.g., CPU) and storage resources. The storage resources may hold distributed programs as well as programs targeted for distribution. The processor of the program distribution server may execute a distribution program to distribute the distribution target program to other computers. Also, in the ensuing description, two or more programs may be implemented as a single program, and a single program may be implemented as two or more programs.

First Embodiment

A first embodiment of the present invention is described below with reference to FIGS. 1 through 23. First, an overall configuration of the embodiment will be explained using FIGS. 1 through 4. Explained next with reference to FIGS. 5A through 7 will be methods of data management and a snapshot scheme as the prerequisite for a cloud backup of the present invention. The cloud backup and restore operations will be discussed using FIG. 8A and the subsequent drawings.

FIG. 1 is a schematic diagram depicting a connection relation between a storage system embodying the present invention on one hand and a cloud service providing an object store on the other hand, along with a configuration overview of the setup involved.

A storage system 10 is a disk array apparatus that provides data protection based on redundant arrays of inexpensive disks (RAID) and a data copy function in or outside the storage system. The storage system 10 includes redundant multiple I/O control subsystems 150*a* and 150*b* (designated by 150 hereunder) as input/output control subsystems. The I/O control subsystems 150 are each connected with multiple drives 140-0, 140-1, . . . 140-*n* (designated by 140 hereunder) and, through a predetermined logical-to-physical block conversion process, configure a group of logical volumes. The I/O control subsystems 150 each include a processor that executes an I/O control program P150, to be discussed later, to implement various functions.

The drives 140 are each a physical storage device such as a solid-state drive (SSD) or a hard disk drive (HDD). The logical volumes are logical storage devices provided by the I/O control subsystems 150.

The logical volume group is provided to a server group 11 by way of multiple host interfaces 110a and 110b and a storage network 12. According to read/write I/O access from the server group 11, the I/O control subsystems 150 issue read/write I/O access to the group of drives 140.

The I/O control subsystems 150 each have multiple network interfaces 120a and 120b (designated by 120 hereunder) for connection to a cloud service 20. The network interfaces 120 are connected to the cloud service 20 provided by a cloud service provider via a dedicated line 13a or an Internet connection 13b.

The storage system 10 includes a storage management subsystem 160 that performs various settings and monitoring of devices. The storage management subsystem 160 is used from a terminal 17a via a local-area network (LAN) 14. Also, the storage management subsystem 160 is connected to an operation management system 18 running in the cloud service 20 via a dedicated line 15a or an Internet connection 15b. The operation management system 18 is used from a terminal 17b on another network. Whereas the storage management subsystem 160 of this embodiment is depicted as being provided inside the storage system 10 in the drawing, the storage management subsystem 160 may alternatively be configured as being provided outside of it. For example, a portion of the storage management subsystem 160 may run on the cloud service 20. The storage management subsystem 160 includes a processor that executes a storage management program P160, to be discussed later, to implement various functions.

In other cases, the storage system 10 may be connected with another storage apparatus. For example, the storage system 10 may be connected with logical volumes 171 and 172 included in the storage system 170 via a connection interface 131 to control the logical volumes 171 and 172 as if they were the own volumes of the system. In another example, the storage system 10 may be connected with another storage system 180 via a connection interface 132 to configure an inter-storage apparatus volume copy function.

Figure 2:
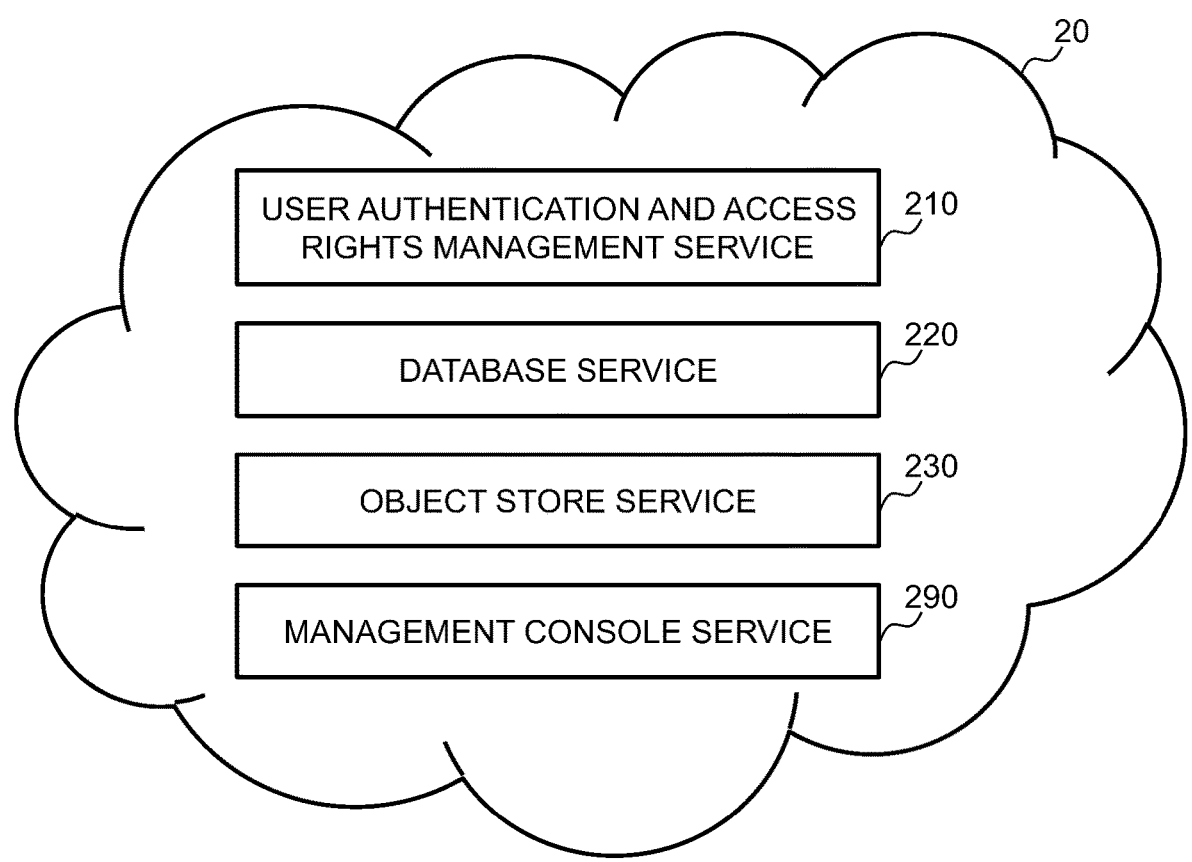
FIG. 2 is a schematic diagram depicting a specific group of services offered by the cloud service in conjunction with the embodiment of the invention.

FIG. 2 is a schematic diagram depicting a specific group of services offered by the cloud service in conjunction with the embodiment of the invention. The cloud service provides various micro-services such as a data store service, a computing service, and an application service. Of these micro-services, only those related to the present invention are described below.

A user authentication and access rights management service 210 is used by the subscriber to the cloud service 20 that issues an access ID and a secret key to each user using this service. Also, this service 210 is used when the rights to the access IDs and an access permission policy regarding each service resource are to be defined. The access by the user and the access to various services are controlled by means of this service 210.

A database service 220 is a service that provides a managed SQL database or an NoSQL database.

An object store service 230 is a service that provides storage of unlimited capacity for writes and reads to and from a group of objects through REST API.

Also, there is a console service 290 that displays starts and stops the use of various services and the use status of the services. For example, through the console service 290, the subscriber may access the user authentication and access rights management service 210 to generate the access ID for the user and to verify the used capacity of the object store service 230.

Figure 3:
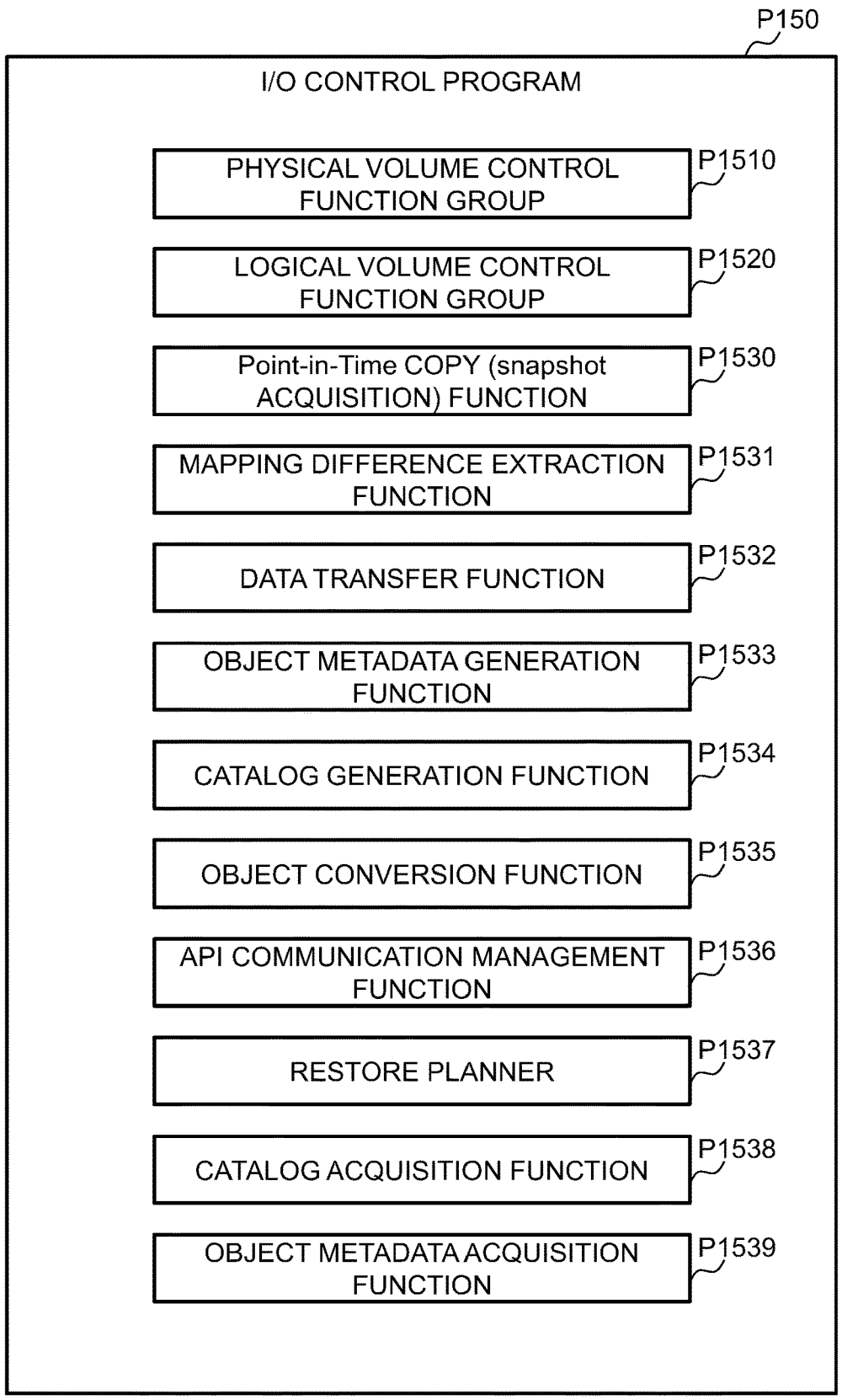
FIG. 3 is a schematic diagram depicting a functional configuration of an I/O control program running in the storage system embodying the invention.

FIG. 3 is a schematic diagram depicting a functional configuration of an I/O control program P150 running in the storage system 10 embodying the invention.

A physical volume control function group P1510 is a basic function set that controls the group of drives 140. As such, the physical volume control function group P1510 performs drive I/O control including failure handling of a drive path and of drives themselves.

A logical volume control function group P1520 is a basic function set that configures logical volumes through a capacity virtualization feature, to be discussed later, and performs host I/O control and data copy.

A Point-in-Time copy function P1530 is a function that saves a still image (called the snapshot hereunder) of a logical volume as a copy in cooperation with the logical volume control function group P1520. The Point-in-Time copy function P1530 also includes a function of copying the saved snapshots back to the original volumes.

A mapping difference extraction function P1531 is a function that acquires differences between mapping tables of snapshots in the cloud backup of this invention.

A data transfer function P1532 is a function that copies data between memories and buffers in the cloud backup of this invention.

An object metadata generation function P1533 is a function of generating metadata that records the correspondence between intra-object location information on one hand and address information regarding blocks in the logical volumes on the other hand in the cloud backup of this invention.

A catalog generation function P1534 is a function of generating catalog data that holds various kinds of information regarding each backup generation in the cloud backup of this invention.

An object conversion function P1535 is a function that performs mutual conversion between binary-form data held in the storage system 10 on one hand and object-form data to be transmitted by use of REST API on the other hand.

An API communication management function P1536 is a function that processes communication with the cloud service with use of REST API through the network interfaces 120, including execution of various recovery processes on errors that may occur.

A restore planner P1537 is a function that plans the procedure for restoring data from the cloud service, by referencing multiple catalogs and the snapshots held in the storage system 10.

A catalog acquisition function P1538 is a function that interprets the content of the catalog acquired from the object store at the time of restore. An object metadata acquisition function P1539 is a function that interprets the content of metadata acquired from the object store, upon retore.

Figure 4:
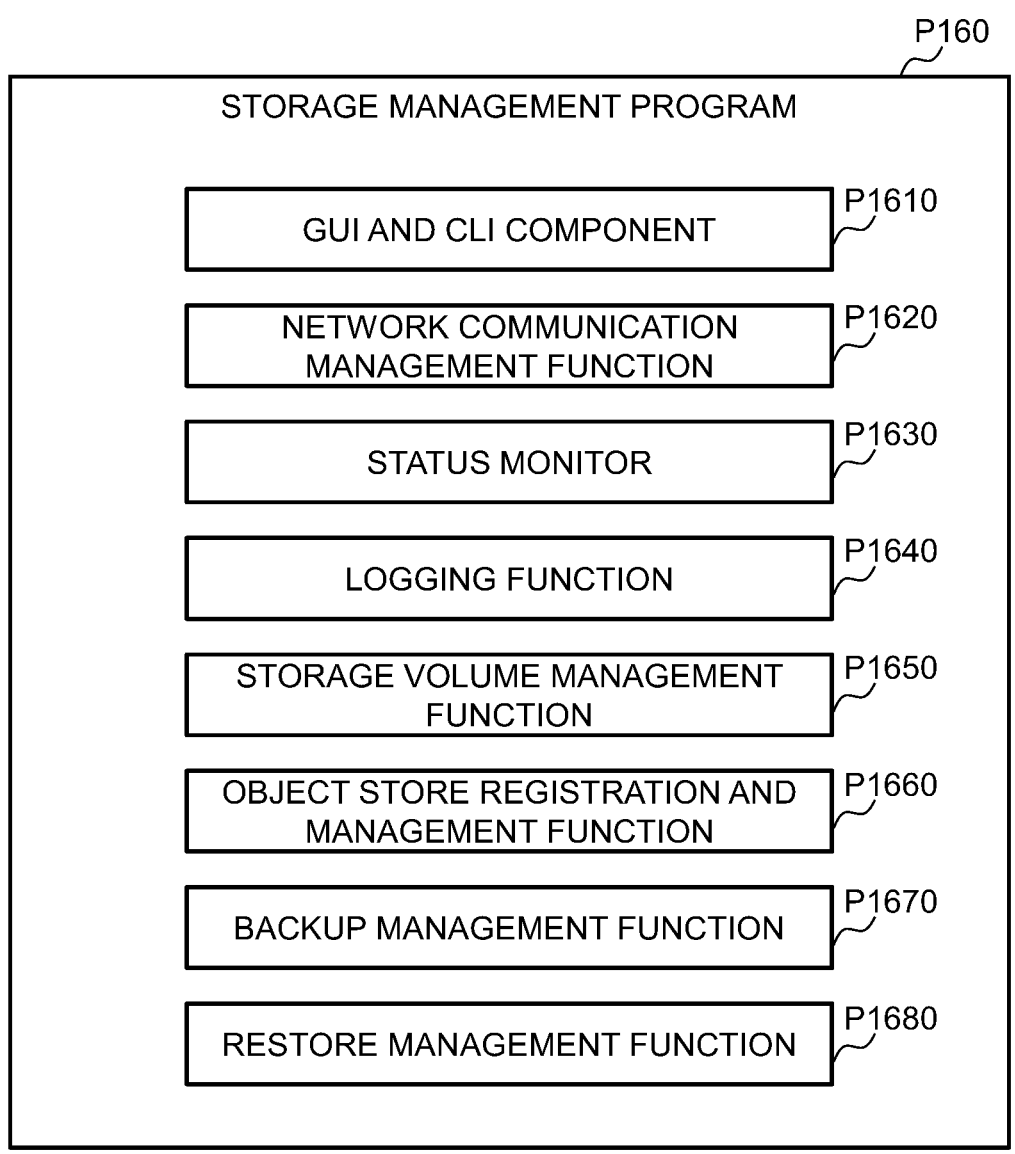
FIG. 4 is a schematic diagram depicting a functional configuration of a storage management program running in the storage system embodying the invention.

FIG. 4 is a schematic diagram depicting a functional configuration of the storage management program P160 running in the storage system 10 embodying the invention.

A graphical user interface (GUI) and command line interface (CLI) component P1610 is a function that provides a user interface allowing the management function to be used from the terminals 17a and 17b and from the operation management system 18. In this embodiment, the GUI and CLI component P1610 provides an object store registration screen and a backup setting screen, for example.

A network communication management function P1620 is a function that manages the setting of the network interfaces 120 for connection to the cloud service 20 and the network setting for connection to the LAN 14. In this embodiment, the network communication management function P1620 is used to set Internet Protocol (IP) addresses, net masks, and gateways for the network interfaces 120, for example.

A status monitor P1630 is a function group that displays the health condition of the hardware included in the storage system 10, used capacities and health conditions of various logical volumes and of the object store, and a progress status and I/O speeds of the ongoing process. In this embodiment, the status monitor P1630 permits verification of the used capacity of the object store, for example.

A logging function P1640 is a function that records logs of various processes. In this embodiment, the logging function P1640 records the start and end of the backup process and errors therein.

A storage volume management function P1650 is a function that configures and manages the group of drives 140, the storage pool constituted by the drives, and logical volumes generated from the storage pool. The storage pool will be discussed later with reference to FIGS. 5A and 5B.

An object store registration and management function P1660 is a function that registers and manages the information regarding the object store service on the cloud service 20 used by the storage system 10.

A backup management function P1670 is a function that performs the backup setting of the cloud backup with this embodiment. Likewise, a restore management function P1680 is a function that gives instructions to restore the cloud backup.

Figure 5A:
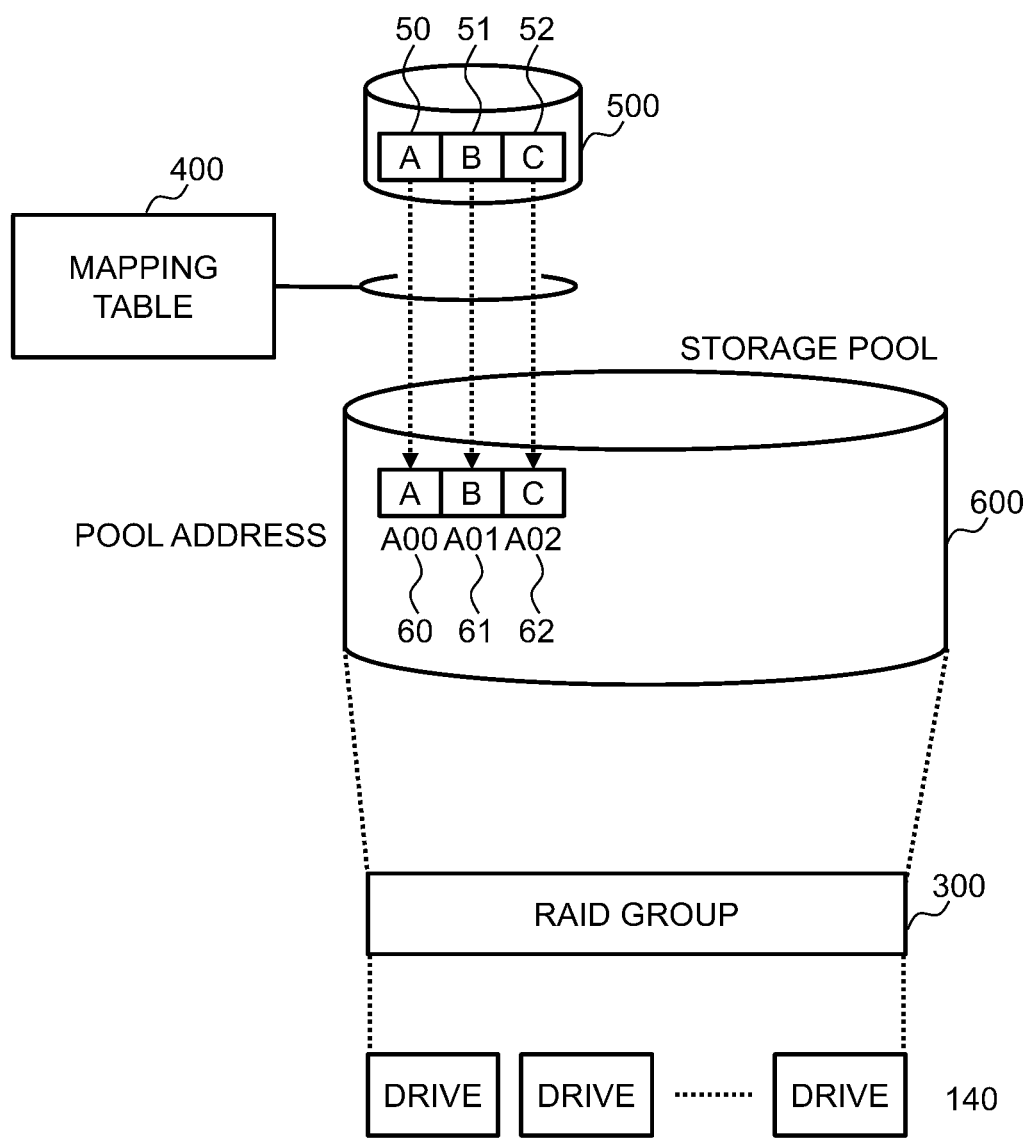
FIGS. 5A and 5B are schematic diagrams depicting a relation between a drive group, a storage pool, and a logical volume in the storage system embodying the invention.
Figure 5B:
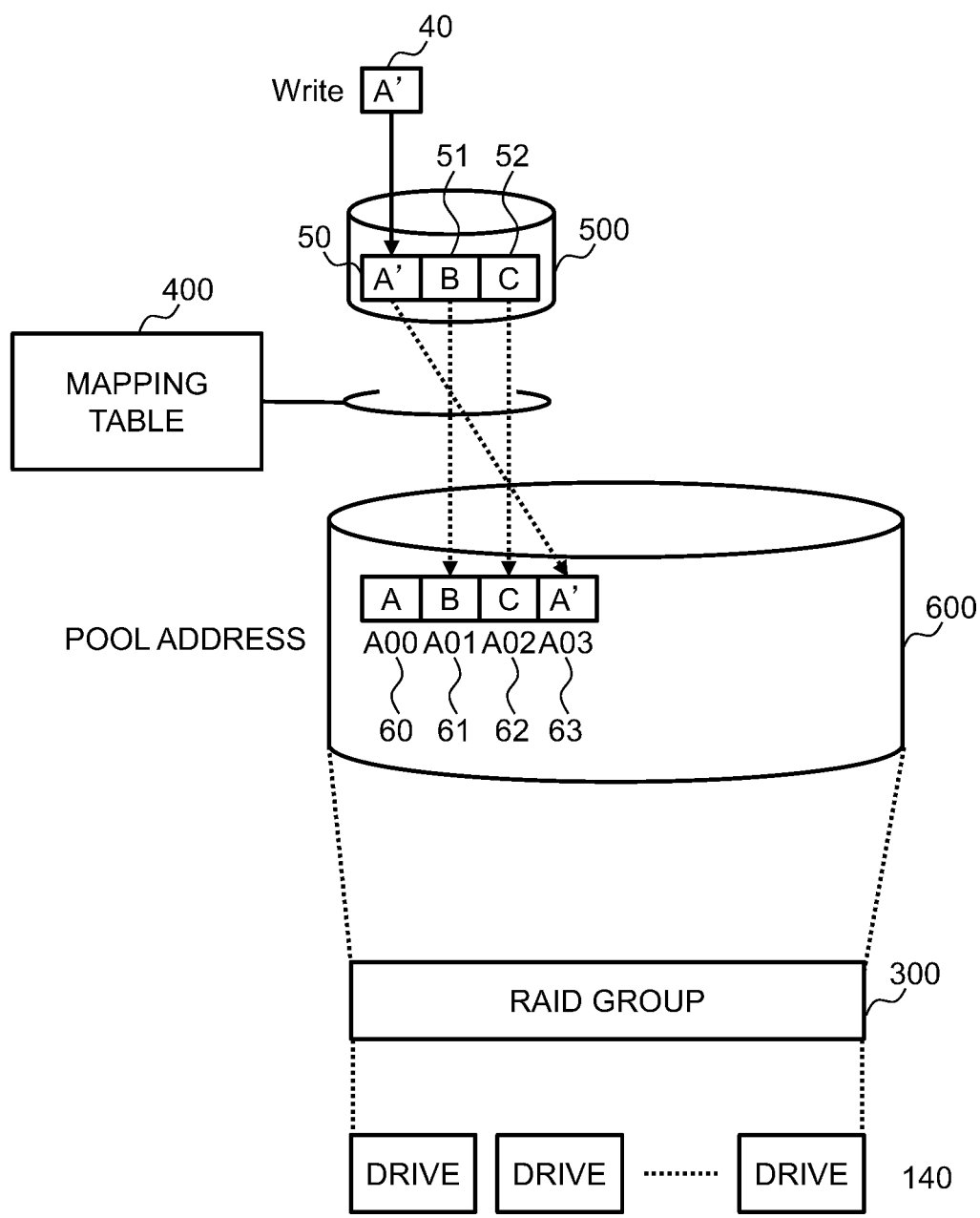

FIGS. 5A and 5B are schematic diagrams depicting the relation between the group of drives 140, a storage pool 600, and a logical volume 500 in the storage system 10 embodying the invention. The relation will first be described in reference to FIG. 5A, followed by a description of a state subsequent to a data update in reference to FIG. 5B.

The storage system 10 configures a RAID group 300 that provides data protection by RAID, by using multiple drives 140. The data to be written to the RAID group 300 undergoes predetermined calculations such as RAID5, before being distributed to and stored into the multiple drives 140.

The RAID group 300 including the multiple drives 140 generally provides a large capacity. Hence, a logical management feature called the storage pool 600 has been defined in recent years to manage the RAID group capacity. In the storage pool 600, the capacity is divided into blocks of a smaller size each. Logical addresses of the pool (i.e., pool addresses) are assigned to the blocks for management purposes.

The storage pool 600 may be configured with multiple RAID groups. The storage system 10 is capable of having multiple storage pools.

The logical volume 500 is a virtual device configured in relation to the capacity of the storage pool 600 managed by Thin Provisioning technology. Since the logical volume 500 is immaterial, data written by a host to the logical volume 500 causes the storage system 10 to temporarily store the data in a memory of the I/O control subsystems 150. Thereafter, some of the blocks in the storage pool 600 are allocated as virtual blocks of the logical volume 500, with the written data stored into the allocated blocks. A mapping table 400 is used to manage the correspondence between the virtual blocks of the logical volume 500 on one hand and the blocks in the storage pool 600 on the other hand.

FIG. 5A depicts a state in which three data items are sequentially written to virtual blocks 50, 51, and 52, before being stored into blocks 60, 61, and 62 indicated by pool addresses A00, A01, and A02, respectively. The information regarding the relations between the two sides of addresses is recorded in the mapping table 400 (the relations are indicated by dotted lines in the drawings).

FIG. 5B depicts a state in which data in the logical volume 500 is updated by the storage system 10 embodying the invention. In the case where the host overwrites the virtual block 50 with new data 40, the storage system 10 allocates a new block 63 in the storage pool 600 and writes the new data 40 to the newly allocated block 63. The storage system 10 then updates the information in the mapping table 400 to associate the virtual block 50 with the new block 63 for management purposes. The block 60 not referenced from anywhere is regarded as an unused block, which is recovered and reused in a suitably timed manner by a processing program of the storage system 10.

Figure 6:
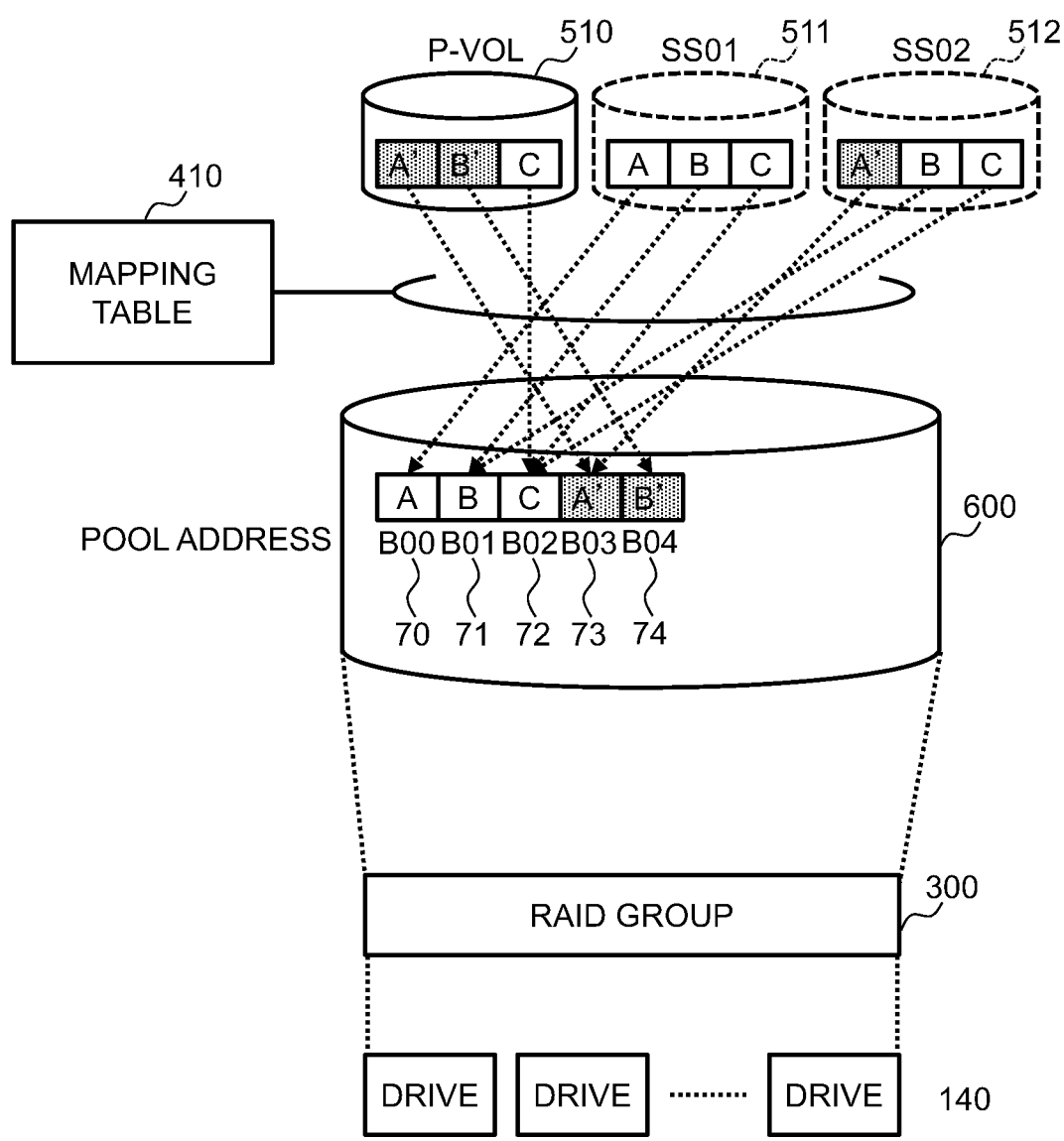
FIG. 6 is a schematic diagram depicting a state in which the storage system embodying the invention acquires snapshots by using management features described in FIGS. 5A and 5B.

FIG. 6 is a schematic diagram depicting a state in which the storage system 10 embodying the invention acquires snapshots by using the management functions discussed in reference to FIGS. 5A and 5B.

A primary volume (P-VOL) 510 is a logical volume accessed by the host. Snapshots (SS01, SS02) 511 and 512 are virtual copies of the primary volume (P-VOL) 510 acquired sometime in the past.

A first snapshot is acquired as the snapshot (SS01) 511 at a point in time when the data items in the primary volume (P-VOL) 510 were "A," "B," and "C." The storage system 10 generates the snapshot (SS01) 511 at this time by copying the mapping information regarding the primary volume (P-VOL) 510 at that point in time. Then a second snapshot is acquired as the snapshot (SS02) 512 after the initial data item "A" in the primary volume (P-VOL) 510 is overwritten with data item "A'." The storage system generates the snapshot (SS02) 512 at that point in time in like manner by copying the mapping information regarding the primary volume (P-VOL) 510. FIG. 6 depicts a state in which the second data item "B" in the primary volume (P-VOL) 510 is overwritten thereafter with data item "B'."

FIG. 7 indicates a mapping table 410 at that point in time. The data items written to the primary volume (P-VOL) 510 are "A'," "B'," and "C," so that the blocks to be referenced are assigned pool addresses B03, B04, and B02, respectively, in the mapping table 410. The snapshot (SS01) 511 maintains the state in which the written data items were "A," "B," and "C," so that the blocks to be referenced are assigned pool addresses B00, B01, and B02. Likewise, in the snapshot (SS02) 512, the blocks to be referenced are assigned pool addresses B03, B01, and B02 corresponding to the data items "A'," "B," and "C," respectively.

The snapshots are managed by the mapping table 410 in the manner described above. Since the blocks B00 through B04 are referenced from the primary volume (P-VOL) 510 or from the snapshots (SS01, SS02) 511 and 512, these blocks are not regarded as unused blocks.

Explained below is the cloud backup performed by use of the above-described snapshots.

FIGS. 8A and 8B are schematic diagrams each depicting an object store registration screen of the storage system 10 embodying the invention. This function is provided by the object store registration and management function P1660 and the GUI and CLI component P1610 indicated in FIG. 4.

FIG. 8A is a schematic diagram depicting an initial screen to be displayed at the time of object store registration. In the case where there are object stores registered in the past, they are displayed in a list such as one with D101 and D102. Where a new object store is to be added, an add button D111 is pressed. On the other hand, where an existing object store is to be deleted, the desired object store is first selected, and a delete button D112 is pressed for erasure. Where an existing object store is to be edited, the desired object store is selected, and the add button D111 is pressed.

FIG. 8B is a schematic diagram depicting a screen for newly registering an object store. This screen is displayed by pressing the add button D111 in FIG. 8A.

First, a cloud service available for the storage system 10 of the present invention is selected from a drop-down box D201. Items D202 through D206 are then displayed according to the selected cloud service.

An item D207 is used to designate a registration name for display in the object store list.

An item D202 is a drop-down box for selecting the region where the selected cloud service is to be used.

Items D203 and D204 are used to register an ID and a secret key that are authentication information necessary for accessing this object store.

An item D205 is used to designate a Bucket in which to store backup data in this object store. The Bucket must be a unique name in the region. For this reason, if no unique name is designated in this item, a unique name is automatically generated from unique information such as the manufacturing number of the storage system and a customer ID not overlapping with those of any other user.

An item D206 is used to select the method of data encryption.

Optionally, a button D211 may be pressed to register a tag. Each tag is formed of a Name paired with a Value. As many tags as desired may be registered.

When the above entries have been made, either a button D212 is pressed to register the object store, or a button D213 is pressed to cancel the registration.

Figure 9:
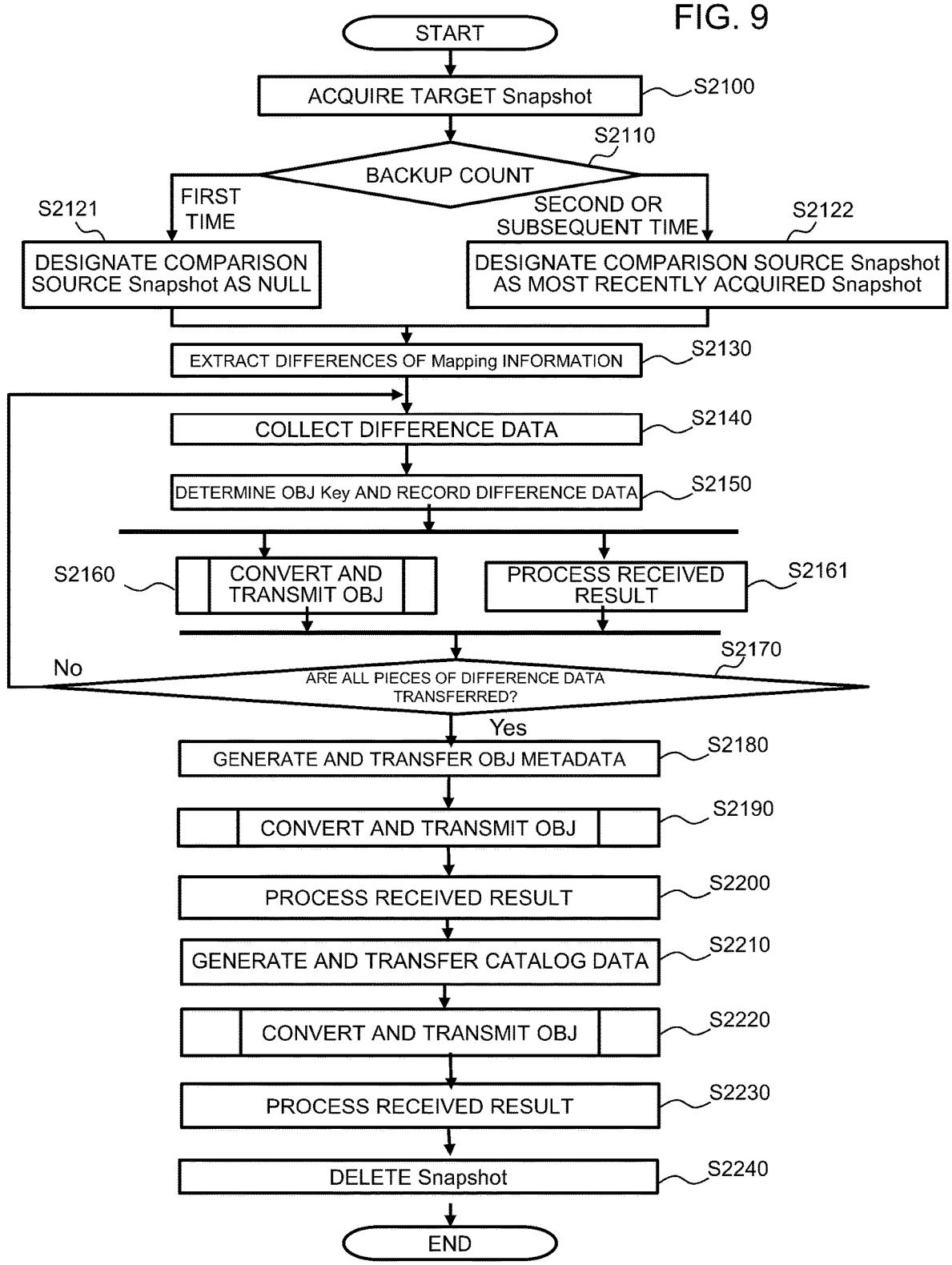
FIG. 9 is a flowchart indicating a backup process performed by the storage system embodying the invention.

FIG. 9 is a flowchart indicating the backup process performed by the storage system 10 embodying the invention. This feature is carried out by the backup management function P1670 in FIG. 4 giving instructions to the I/O control program P150 in FIG. 3 in accordance with an established backup schedule. The information necessary for the operations involved is shared by both functions as needed.

The first process to be performed in the backup is to extract the backup target data from two snapshots, old and new. Specifically, the target data is identified by extracting the differences between the snapshots by use of the mapping table 410. What follows is a description of a detailed process flow ranging from the extraction of the differences to the storing of the extracted differences into the object store.

Upon receipt of an operation instruction, the I/O control program P150 causes the Point-in-Time copy function P1530 to acquire a snapshot of the logical volume targeted to be backed up (S2100). Specifically, as discussed above with reference to FIGS. 6 and 7, the snapshot is obtained by copying the mapping table of the target volume.

The I/O control program P150 then verifies a backup count (S2110). In the case where this is a first-time backup (S2110: first time), the I/O control program P150 sets NULL for the old snapshot acting as a comparison source for backup (S2121). This serves as a dummy snapshot having a mapping table with its pool addresses filled with zeros indicating invalid values.

In the case where this backup is a second or subsequent-time backup (S2110: second or subsequent time), the I/O control program P150 selects the snapshot acquired in the preceding backup, as the comparison source (S2122).

The I/O control program P150 then causes the mapping difference extraction function P1531 to identify the data to be backed up (S2130). Specifically, by use of the comparison source snapshot, backup target snapshot, and mapping tables, an exclusive-OR is performed between the pool addresses of the same block numbers. If the result is zero (i.e., if the addresses are the same), the block in question is indicated to be not a backup target; if the result is non-zero (i.e., if the addresses are different), the block is indicated to be a backup target (non-zero is handled as 1).

Then, in order to turn multiple blocks to be backed up into an object, the I/O control program P150 reads the target blocks from the storage pool 600 according to the results of the previous extraction and stores the extracted blocks into a transfer memory (S2140). Under resource constraints of the I/O control subsystems 150, not all blocks can be read out collectively; they are processed in units of a predetermined size (e.g., in units of 16 MB).

The I/O control program P150 then determines the name of the object (OBJ Key] to be transmitted this time, and accumulates information regarding the blocks included in the object (e.g., blocks being compressed/not compressed, their sizes, etc.) (S2150). Through the object conversion function P1535 and the API communication management function P1536, the I/O control program P150 converts the backup data into the object and transmits the object to the object store (S2160). In a manner asynchronous with the transmission, the I/O control program P150 receives the result of reception by the object store to check whether the transfer is successful (S2161).

The I/O control program P150 repeats the above-described steps S2140 through S2161 until all the pieces of extracted difference data have been transmitted (S2170: No). When all the pieces of data have been transferred (S2170: Yes), the I/O control program P150 generates metadata and stores it into the transfer memory (S2180). Through the object conversion function P1535 and the API communication management function P1536, the I/O control program P150 stores the metadata as an object into the object store (S2190) and checks whether the transfer is successful (S2200). The metadata will be discussed later in detail with reference to FIG. 12.

After verifying that the current backup data paired with its metadata is stored into the object store through the steps above, the I/O control program P150 generates catalog data describing various kinds of information regarding the backup for reference at the time of restore (S2210). The I/O control program P150 transfers the generated catalog data to the object store (S2220), and checks whether the transfer is normally terminated (S2230).

Finally, the I/O control program P150 does a cleanup of the snapshots used for the backup. The cleanup is performed to prevent the number of snapshots from becoming inordinately large if snapshots were to be acquired of every backup. Specifically, given the number of backup generations (e.g., 3) set beforehand by the user in the storage system 10, the snapshots previous to the predetermined number of generations are deleted (S2240) (if a differential backup is designated, the snapshot used for the preceding full backup is excluded). The erasure is executed by deleting the mapping table 410 of the snapshot in question. Those blocks in the storage pool that are no longer referenced as a result of deleting the snapshot are recovered by the I/O control program P150 and reused in a suitably timed manner.

Figure 10A:
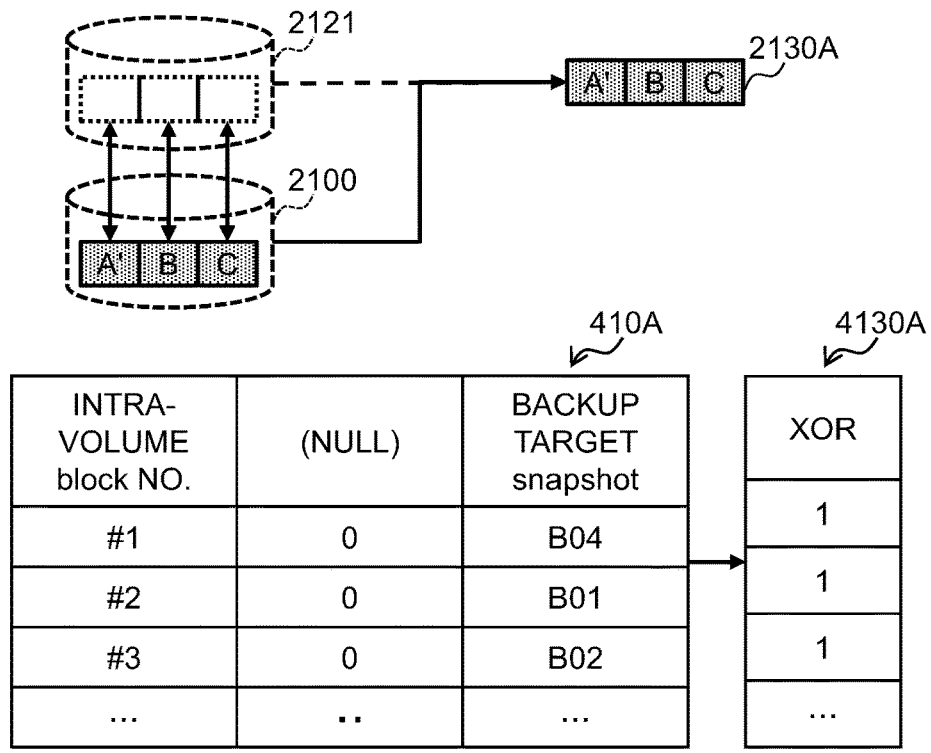
FIGS. 10A and 10B are schematic diagrams depicting how backup target data is identified in the backup process by the storage system embodying the invention.
Figure 10B:
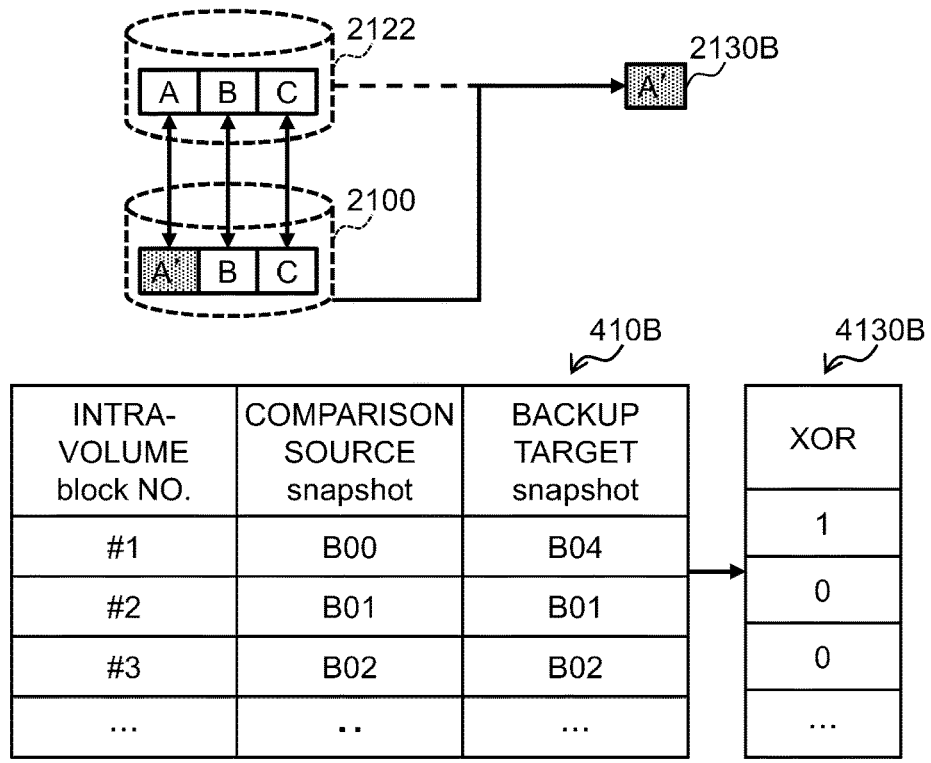

FIGS. 10A and 10B are schematic diagrams depicting how the backup target data is identified in steps S2110 through S2130 in the flowchart of FIG. 9.

FIG. 10A depicts the case where a first-time backup is performed in step S2110 of the flowchart. A comparison source snapshot 2121 is a dummy snapshot in the case where a mapping table 410A is set to NULL. A snapshot 2100 is a backup target snapshot. Since the address of the comparison source is zero as indicated in the mapping table 410A, an exclusive-OR between the two snapshots gives a result 4130A indicating that all data items are targeted for backup, i.e., a full backup (2130A).

FIG. 10B depicts the case where an incremental backup is performed in step S2110 of the flowchart and where this backup is a second or subsequent-time backup.

A comparison source snapshot 2122 is the snapshot targeted for the preceding backup, and the snapshot 2100 is targeted for the current backup. A mapping table 410B applies to these two snapshots. An exclusive-OR 4130B between the two snapshots identifies only data "A" stored in the block with block number #1, as the backup data (2130B). It can thus be recognized that only the updated data is backed up.

Figure 11:
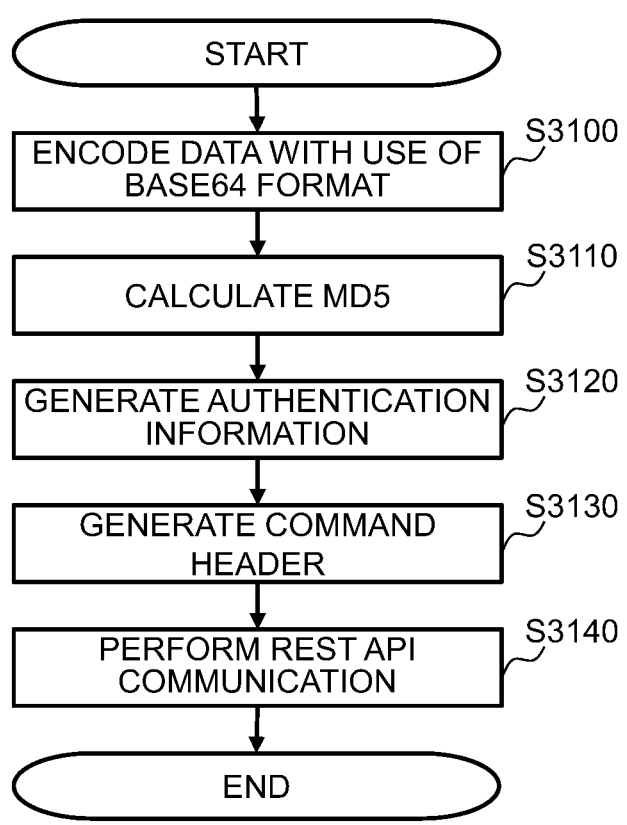
FIG. 11 is a flowchart indicating an object conversion and transmission process in FIG. 9 performed by the embodiment of the invention.

FIG. 11 is a flowchart depicting the processing procedure for object conversion and object transmission (S2160, S2190, S2220) in FIG. 9. In executing this process, the storage system 10 converts the data stored in binary form on disks to data in text form, and transmits the text-form data through REST API with use of a hyper text transfer protocol (HTTP) protocol.

The I/O control program P150 causes the object conversion function P1535 to encode the data held in the transfer memory into text data using BASE64 format (S3100). From the encoded data, an MD5 hash value is calculated for data protection purposes (S3110). Next, the I/O control program P150 generates authentication information (S3120) by performing predetermined calculations with use of the Access ID and Secret Key from the object store registration information. The API communication management function P1536 of the I/O control program P150 then configures object data (S3130) formed of an HTTP header and an HTTP body, the HTTP header including the MD5 value and authentication information generated earlier, the date and time of transmission, and size information, and the HTTP body being the text data encoded in BASE64 format. Using a PUT or POST command, the API communication management function P1536 stores the object data into the object store by REST API communication (S3140).

FIG. 12 is a tabular view indicating a structure of metadata in the backup process performed by the embodiment of the invention. The object has a unique OBJ Key (T150) representing its name. The unique OBJ Key may be formed by combining, for example, a product number, a volume number, and a backup generation number.

The metadata T150 is stored in the object store with use of an OBJ Key "VSP56342-v7f-s02.meta." What is recorded in the metadata includes a bitmap size (T1510), a bitmap (T1511), the OBJ key (T1520) of first backup data, the size (T1521) of each block included in the first backup data, the OBJ key (T1530) of second backup data, the size (T1531) of each block included in the second backup data, etc. The bitmap (T1511) is an exclusive-OR between the mapping tables generated at the time of extracting the backup target data, indicating whether the data is included (1) or not included (0) in order of block numbers. In FIG. 12, for example, the bitmap T1511 is headed by "110011" indicating that the backup data includes the data items with block numbers #1, #2, #5, and #6 each having a bit "1" and excludes the data items with block numbers #3 and #4.

When transferred as the object, the backup data is separated into predetermined sizes for processing purposes. Thus, there exist multiple OBJ Keys such as T1520 and T1530. The block lengths T1521 and T1531 indicate the sizes of the data blocks included in the backup, and are used to determine the boundary of each block. Whereas FIG. 12 gives an example in which the data is stored uncompressed, so that the same size values are lined up, different size values appear in the case where the blocks are compressed.

FIGS. 13A and 13B are tabular views indicating catalog data stored into the object store in the backup process performed by the embodiment of the invention. The catalog data includes various kinds of information to be referenced at the time of restore. The various kinds of information include, for example, a backup source, the capacity necessary for restoration, the OBJ Key for accessing the backup data, and parent-child relation information regarding the backup. FIG. 13A indicates the catalog data for a second-time backup, and FIG. 13B depicts the catalog data for a first-time backup.

Catalog data T160 is stored in the object store with use of an OBJ Key "VSP56342-v7f-s02.catalog." What is recorded in the catalog data T160 includes a device product number (T1610), a backed-up logical volume number (T1611), the provisioning size and used size of this volume (T1612), the generation number (T1613) of the snapshot used for backup, the date and time (T1614) of snapshot acquisition, a metadata OBJ Key (T1615), and the OBJ Key (T1616) of the previous-generation catalog data. The above pieces of information indicate that this is the backup with a volume number 0x7f in the apparatus having a device product number VSP56342 and that, when restored, the backup turns into a volume of 16 TB. It is also indicated that the backup was acquired at 2100 hours on Apr. 28, 2021 with use of a snapshot with number 2 and that the metadata "VSP56342-v7f-s02.meta" need only be referenced in order to access the backup data. It is further indicated that since there exists the OBJ Key of the parent catalog data, the catalog data "VSP56342-v7f-s01.catalog" needs to be restored before this backup is restored.

Catalog data T170 is pointed to as the parent catalog in the catalog data T160. Record information indicates that this is a backup of the same volume in the same apparatus (T1710, T1711, T1712), that the backup was acquired at 1800 hours on Apr. 28, 2021 with use of a snapshot generation number 1, and that the metadata "VSP56342-v7f-s01.meta" need only be referenced in order to access the backup data. Since there is no description of the parent catalog, it can be recognized that this backup need only be restored first.

Figure 14:
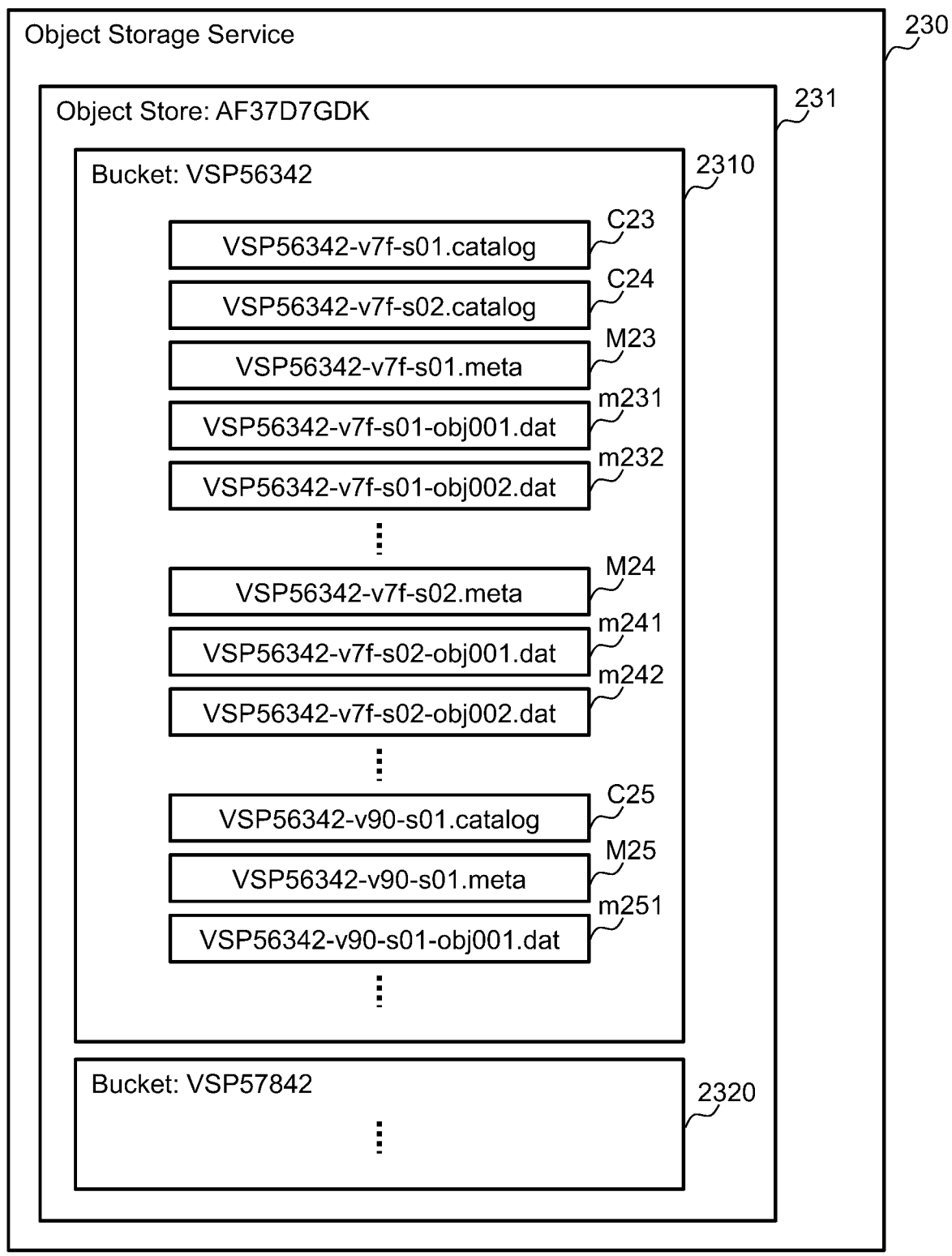
FIG. 14 is a schematic diagram depicting how catalog data, metadata, and a backup data group in the embodiment are stored in an object store service provided by the cloud service.

FIG. 14 is a schematic diagram depicting how the catalog data, metadata, and backup data group discussed above are stored in the object store service 230 provided by the cloud service 20.

The object store service 230 has a region 231 that can be accessed using the authentication information registered through the screen in FIG. 8B. The region 231 includes a bucket 2310 that stores the backup data of the storage system 10. The bucket 2310 stores a first-generation backup catalog C23 and a second-generation backup catalog C24 of the logical value number 0x7f, and metadata M23, metadata M24, backup data groups m231, m232, ... m241, m242, etc., referenced from each of the catalogs. The bucket 2310 also includes a backup of a logical volume number 0x90, storing a catalog C25, metadata M25, backup data 251, etc.

The region 231 may include multiple buckets. For example, a bucket 2320 is indicated to store a backup of another storage system in which the same authentication information is registered.

The restore operation performed by the embodiment of the present invention is described below with reference to FIG. 15 and subsequent drawings.

Figure 15:
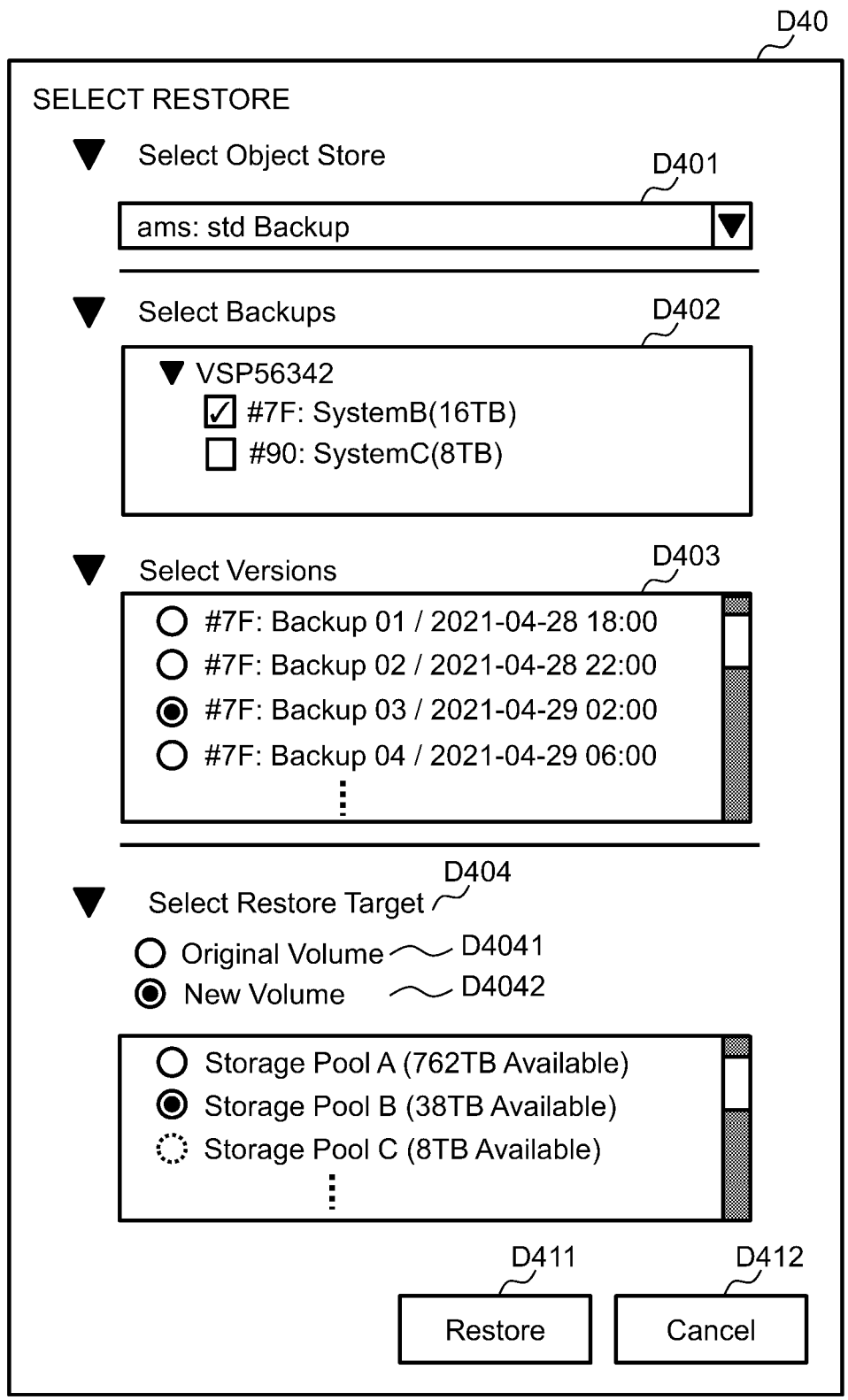
FIG. 15 is a schematic diagram depicting a backup restore selection screen of the embodiment of the invention.

FIG. 15 is a schematic diagram depicting a backup restore selection screen of the embodiment of the invention. This screen is provided by the GUI and CLI component P1610 and the restore management function P1680 that are included in the storage management program P160.

An item D401 is a drop-down box for selecting the object store for use in restore. The object store (and bucket) registered in FIGS. 8A and 8B is displayed as the option. In FIG. 15, for example, the object store "ams: std Backup" is selected.

An item D402 is used to select the volume to be restored. According to the choice made in the item D401, the item D402 displays information regarding the volumes obtained by the storage management program P160 searching through the bucket in the storage-managed object store. The search operation will be discussed later with reference to FIG. 16.

An item D403 is used to select the backup data of the volume to be restored. The item D403 displays the backup data filtered according to the choice made in the item D402. In FIG. 15, for example, the volume with a logical volume number #7F is selected, so that the item D403 displays only the backup data corresponding to the volume number #7F.

An item D404 is used to select the destination to which to restore the volume. In FIG. 15, for example, the choice in the item D404 is to restore the volume to a new logical volume (D4042). The choice entails using storage pool B as the destination for volume generation. Storage pool C is not selectable because the storage pool C is determined by the storage management program P160 to be short of the capacity necessary for the restore (see item D402).

Figure 16:
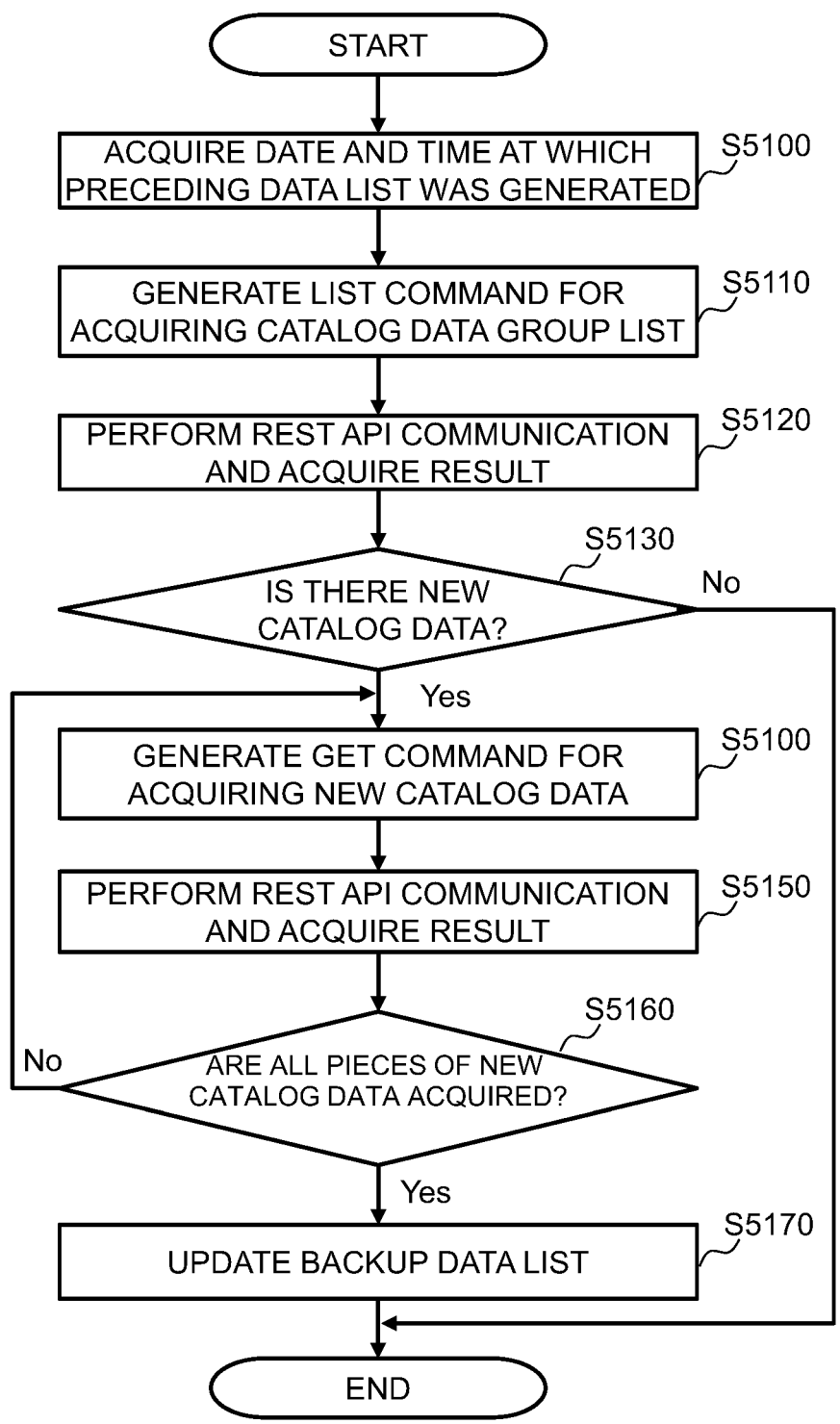
FIG. 16 is a flowchart applicable when the storage management program in the embodiment of the invention acquires a list of backup data.

FIG. 16 is a flowchart applicable when the storage management program P160 embodying the present invention acquires the backup data displayed listed on the screen in FIG. 15.

Prior to the display of the restore selection screen, the storage management program P160 acquires the date and time at which the previous backup data list was generated (S5100). Next, the storage management program P160 generates a LIST command for acquiring a catalog file list of this object store in cooperation with the I/O control program P150 (S5110). Specifically, the storage management program P160 generates the LIST command for obtaining the group of OBJ Keys each ending with ".catalog." The storage management program P160 then issues the LIST command via the API communication management function P1536, and obtains the result of the command (S5120). In the case where new catalog data not included in the previous list is not found (S5130: No), the storage management program P160 determines that the backup data list is the most recent and terminates the process. On the other hand, in the case where there exists new catalog data not included in the previous list (S5130: Yes), the storage management program P160 generates a GET command (S5140) for catalog data acquisition in order to obtain the various kinds of information included in the new catalog data. The storage management program P160 then issues the GET command via the API communication management function P1536, and obtains the result (S5150). The above steps are repeated until the acquisition of all pieces of new catalog data is completed (S5160). When all pieces of new catalog data have been obtained (S5160: Yes), the storage management program P160 updates the backup data list (S5170) and terminates the process.

This embodiment of the invention also works when the storage system at the restore destination is different from the storage system of which the backup is acquired. More specifically, when the user registers the object store indicated in FIGS. 8A and 8B to the storage system at the restore destination, it becomes possible to select the backup data by use of the steps of backup data list acquisition in FIG. 16 together with applicable screen indications in FIG. 15. In this case, the source logical volume does not exist in the storage system at the restore destination, so that restoration to the source volume (D4041) is not selectable in the item D404 of FIG. 15.

Figure 17:
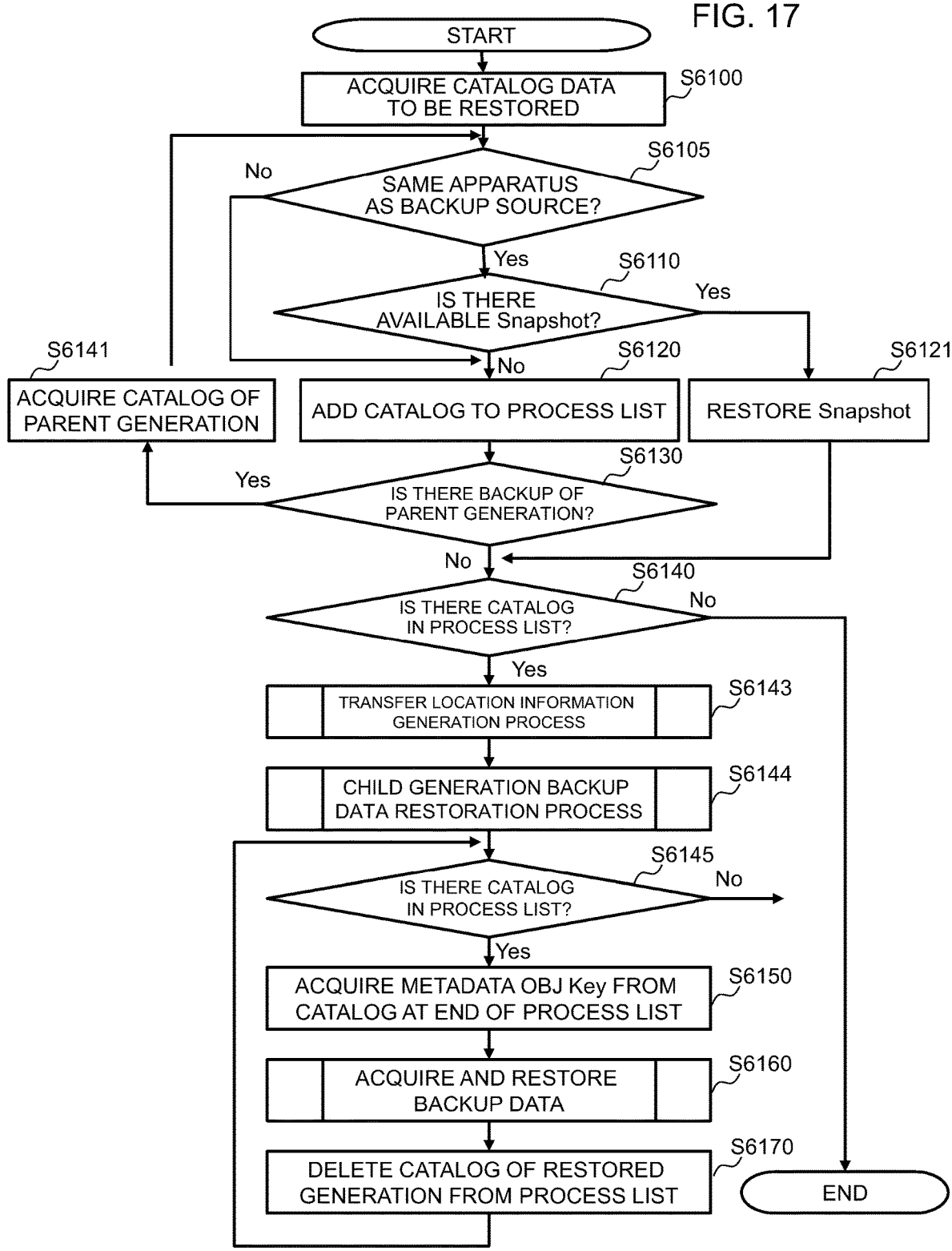
FIG. 17 is a flowchart indicating a restore procedure performed by the embodiment of the invention.

FIG. 17 is a flowchart indicating the restore procedure performed by the embodiment of the invention. When the restore button in FIG. 15 is pressed (D411), the storage management program P160 causes the I/O control program P150 to start the restore process. The restore process is performed in such a manner that, if any snapshot used as the backup data remains in the storage system, the snapshot is utilized, and that if no such snapshot remains in the storage system, the backup data is acquired from the object store and restored.

First, the I/O control program P150 acquires the catalog data of the backup selected as the target to be restored (S6100).

Next, the I/O control program P150 references the logical volume numbers and snapshot numbers included in the catalog data, to verify whether the snapshot of the applicable volume exists and is available in the storage system. In the case where such a snapshot exists and is available (S6110: Yes), that means the backup data remains in the storage system as a snapshot. The I/O control program P150 then restores the snapshot to the restore destination volume (S6121). Specifically, the content of the mapping table of the snapshot is copied to the mapping table of the restore destination volume. With no data written to or read from the volumes, the process is completed at high speed.

On the other hand, where the snapshot does not exist (S6110: No), it is necessary to acquire the backup data from the object store in the cloud. The I/O control program P150 adds the catalog data to a process list managed by the restore planner P1537. Next, the I/O control program P150 references the OBJ Keys of the parent catalog included in the catalog data, to verify whether there is a parent-generation backup (S6130). In the case where the parent-generation backup exists (S6130: Yes), the I/O control program P150 acquires the catalog data of the parent generation (S6141), and repeats steps S6110 through S6130. This allows the process list to register, from the end of the list to the top thereof, the catalog data of the backup to be restored in order of generations, from parent to child to grandchild. The subsequent steps, when carried out, execute the process of restoring the data according to the catalog group registered in the process list.

The I/O control program P150 verifies whether there exists the catalog data in the process list. In the case where the catalog data is not found in the process list (S6140: No), the I/O control program P150 terminates the process because all steps necessary for the restore have been completed. In the case where the catalog data exists in the process list (S6140: Yes), the I/O control program P150 performs a parent-generation data transfer list generation process (S6143), which is the process of extracting the data to be restored from the backup of the parent generation. As a result of this process, a transfer location information bitmap is generated for each of the catalogs in the process list, the bitmap indicating the storage location for the data to be transferred from the catalog data. This process will be discussed later in detail with reference to FIG. 18.

Next, the I/O control program P150 performs a child-generation backup data restoration process (S6144). In the case where the backup data in child relation to the restore target backup is found in the restoration destination apparatus as a result of executing this process, the I/O control program P150 extracts the location in which there is stored the data remaining unchanged from the restore target, i.e., the same data as in the restore target, and restores the data in that storage location to the restore target volume. Also, given the child-generation backup data, the I/O control program P150 generates a "child-generation restoration bitmap," i.e., a bitmap indicative of the locations in which the pieces of data have been restored from the child-generation backup data. In the case where the child-generation backup data is not found in the restoration destination apparatus, that means there is no restorable data. With no data restored, the child-generation restoration bitmap is set to A110. Details of this process will be discussed later with reference to FIG. 19.

Next, by use of the process list, the bitmap associated therewith, and the child-generation restoration bitmap, the I/O control program P150 acquires the backup data from the object store to restore the backup data. By referencing the catalog data at the end of the process list (i.e., catalog data of the oldest parent generation), the I/O control program P150 acquires the OBJ Key of the metadata (S6150). The I/O control program P150 then acquires the object pointed to by the OBJ Key from the object store, to perform a backup data acquisition and restoration process (S6160). Detailed steps of the backup data acquisition and restoration process will be discussed later with reference to FIG. 20.

Thereafter, the I/O control program P150 removes from the process list the catalog data of the generation of which the data has been acquired and restored (S6170). The I/O control program P150 repeats steps S6145 through S6170 until the catalog data in the process list is exhausted, thereby completing the process.

Figure 18:
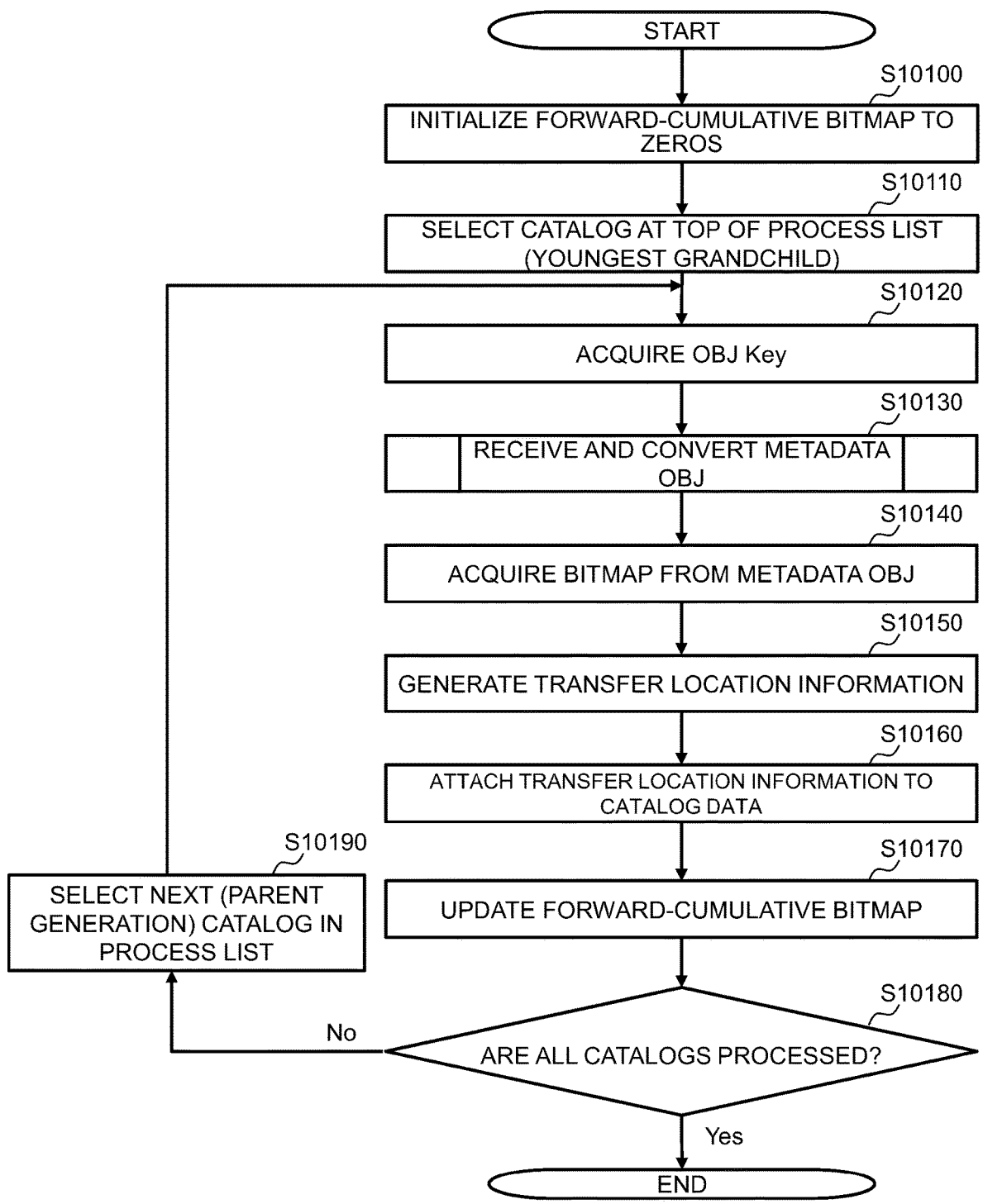
FIG. 18 is a flowchart indicating how a transfer location information generation process in FIG. 17 is performed by the embodiment of the invention.

FIG. 18 is a flowchart indicating how the transfer location information generation process in step S6143 in FIG. 17 is carried out. In executing this process, the I/O control program P150 interprets the bitmap acquired as per the metadata, to generate a bitmap indicating the storage location for the data to be transferred from the cloud among the pieces of backup data of each generation. The bitmap is referred to as the transfer location information. The transfer location information is generated for each generation. In order to generate the transfer location information, a forward-cumulative bitmap is used. The forward-cumulative bitmap is used in common for all generations. The forward-cumulative bitmap indicates whether data is determined to be valid (value 1) or yet to be determined to be valid (value 0) in each of the blocks in the restore destination volume.

First, the I/O control program P150 initializes (turns to zeros) the forward-cumulative bitmap (S10100). Next, the I/O control program P150 references (S10110) the catalog data at the top of the process list (i.e., catalog data of the youngest grandchild generation) to acquire the OBJ Key of the metadata (S10120). The I/O control program P150 then acquires from the object store the object pointed to by the OBJ Key (S10130). The process of object acquisition from the object store will be discussed later in detail with reference to FIG. 21. From the acquired metadata, the bitmap part is clipped (S10140).

Next, the I/O control program P150 generates transfer location information by using the bitmap. The transfer location information has an initial value 0, has the same length as the bitmap part, and is used to manage information regarding the storage locations requiring transfer from the catalog data. The I/O control program P150 temporarily generates a bitmap representing an inverted forward-cumulative bitmap, and performs an AND operation between the inverted forward-cumulative bitmap and the bitmap part to obtain the transfer location information (S10150). In the transfer location information, a non-zero portion represents the storage location for the data updated in the current generation, indicating that transfer is to be performed from the data OBJ associated with the catalog data. The I/O control program P150 then manages the transfer location information in association with the catalog data targeted to be processed (S10160). That is, the transfer location information can thereafter be acquired using the process target catalog data as the key.

Finally, an OR operation is performed between the transfer location information and the forward-cumulative bitmap to overwrite and update the forward-cumulative bitmap (S10170). In the forward-cumulative bitmap, this operation newly sets to non-zeros the bits of the locations to which to restore the data from the process target catalog data. The non-zeros indicate the locations in which the data not required to be restored anew from the cloud in subsequent steps is stored.

Next, if the catalog data of one generation ago is found in the process list (S10180: No), the catalog data of the parent generation is acquired from the process list (S10190). The transfer location information is then generated in like manner (S10120 through S10170).

In the case where all the bits in the forward-cumulative bitmap become non-zeros halfway through the process, that means there is no further data block to be acquired from the catalog data of the parent generation. In that case, the process may be terminated halfway to reduce the quantity of metadata OBJs. If the process is allowed to continue, all pieces of transfer location information associated with the subsequent catalog data are set with A110. Hence, in the case where the process is terminated halfway, the transfer location information of A110 is generated and made associated with the subsequent catalog data.

Figure 19:
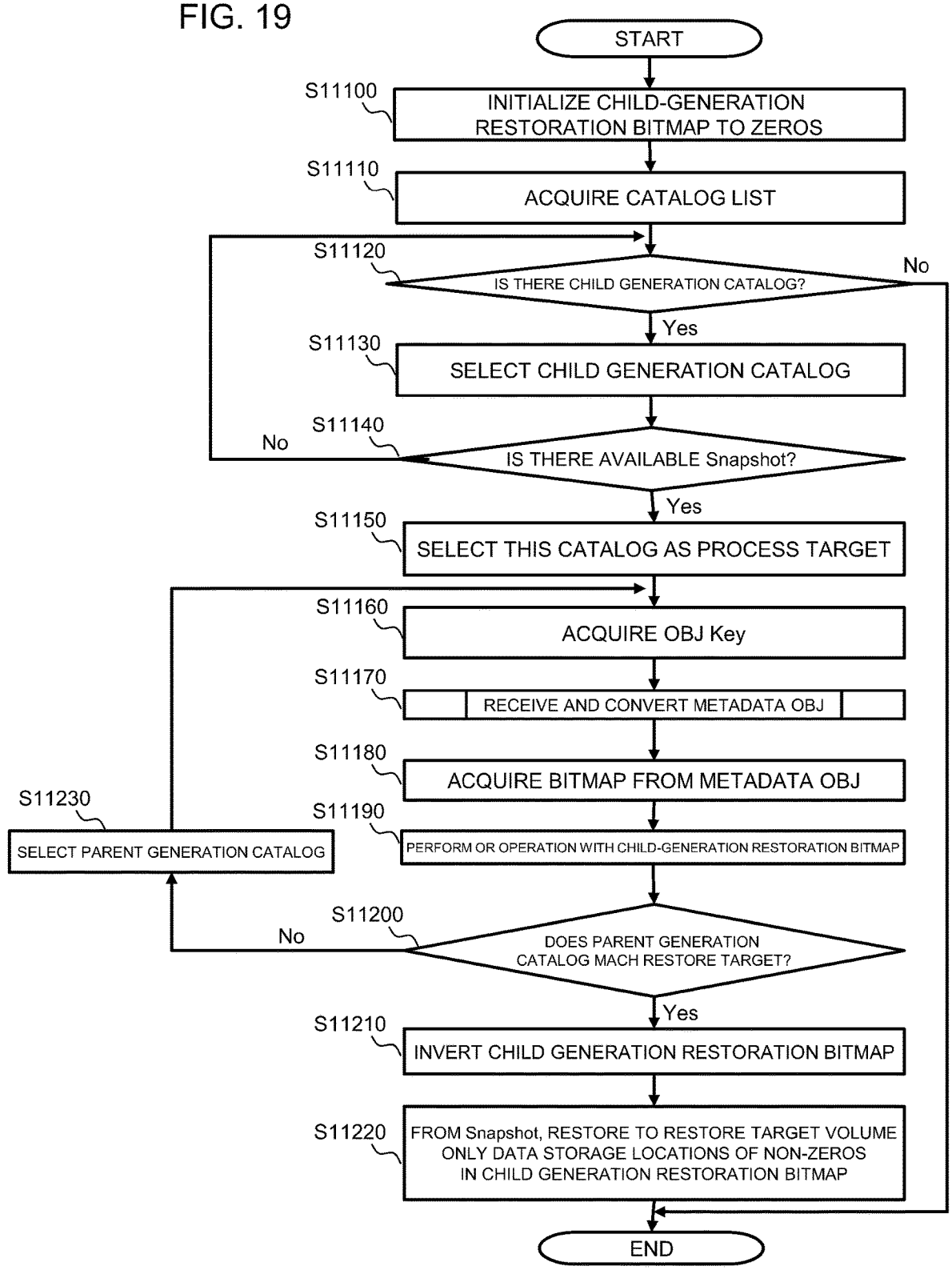
FIG. 19 is a flowchart indicating how a child-generation backup data restoration process in FIG. 17 is performed by the embodiment of the invention.

FIG. 19 is a flowchart indicating how the child-generation backup data restoration process in step S6144 in FIG. 17 is performed. In executing this process, where a snapshot in child relation to the restore target is found in the restoration destination apparatus, the I/O control program P150 interprets the bitmap acquired in reference to the metadata regarding the child-generation catalog data, to generate a bitmap (called a "child-generation restoration bitmap") indicating the locations of the data to be restored from the backup in the restoration destination apparatus. Using the generated bitmap and the snapshot data in the restoration destination apparatus, the I/O control program P150 restores the data to the restore volume.

First, the I/O control program P150 initializes the child-generation restoration bitmap (S11100). Next, the I/O control program P150 determines whether there exists a snapshot in child relation to the restore target snapshot. Specifically, the I/O control program P150 first acquires a catalog list associated with the restore volume (S11110). In the case where there is no catalog in child relation to the restore volume (S11120: No), the process is terminated. Where there exists a child-generation catalog (S11120: Yes), the I/O control program P150 determines whether the backup corresponding to the child-generation catalog is found in the restoration destination apparatus (S11130, S11140). In the case where there is no snapshot in the restoration destination apparatus (S11140: No), the I/O control program P150 searches for the catalogs of further child generations, and references the catalog data sequentially in the above-described steps. The process is continued either until an available snapshot is found (S11140: Yes) or until the child-generation catalogs are exhausted (S11120: No).

Next, the I/O control program P150 selects the catalog of which the backup is found in the restoration destination apparatus (S11150), acquires the OBJ Key included in the target catalog, and obtains the bitmap from within the meta information (S11160 through S11180). The I/O control program P150 performs an OR operation between the bitmap in the meta information and the child-generation restoration bitmap to overwrite and update the child-generation restoration bitmap with the result of the OR operation. The I/O control program P150 then references the OBJ Key of the parent catalog found in the target catalog data, to identify the parent-generation catalog.

In the case where the parent-generation catalog fails to match the restore target catalog (S11200: No), the I/O control program P150 references the OBJ Key of the parent catalog to select the parent-generation catalog (S11230). Step S11160 and the subsequent steps are then repeated thereafter.

In the case where the parent-generation catalog matches the restore target catalog (S11200: Yes), the I/O control program P150 inverts the child-generation restoration bitmap to overwrite and update the bitmap (S11210). At this point, the pieces of data in the non-zero storage locations in the child-generation restoration bitmap are the pieces of data not updated from the target backup data, which indicates that the data equal to the restore target is stored in subsequent snapshots.

Next, from the volume of the catalog selected in step S11130, i.e., from the volume of which the available snapshot is held in the restoration destination apparatus, the data in the storage location corresponding to the child-generation restoration bitmap is restored to the restore target volume. Specifically, among the mapping tables of the snapshots, only the table in the non-zero storage location in the child-generation restoration bitmap is copied to the mapping table of the restore destination volume.

Figure 20:
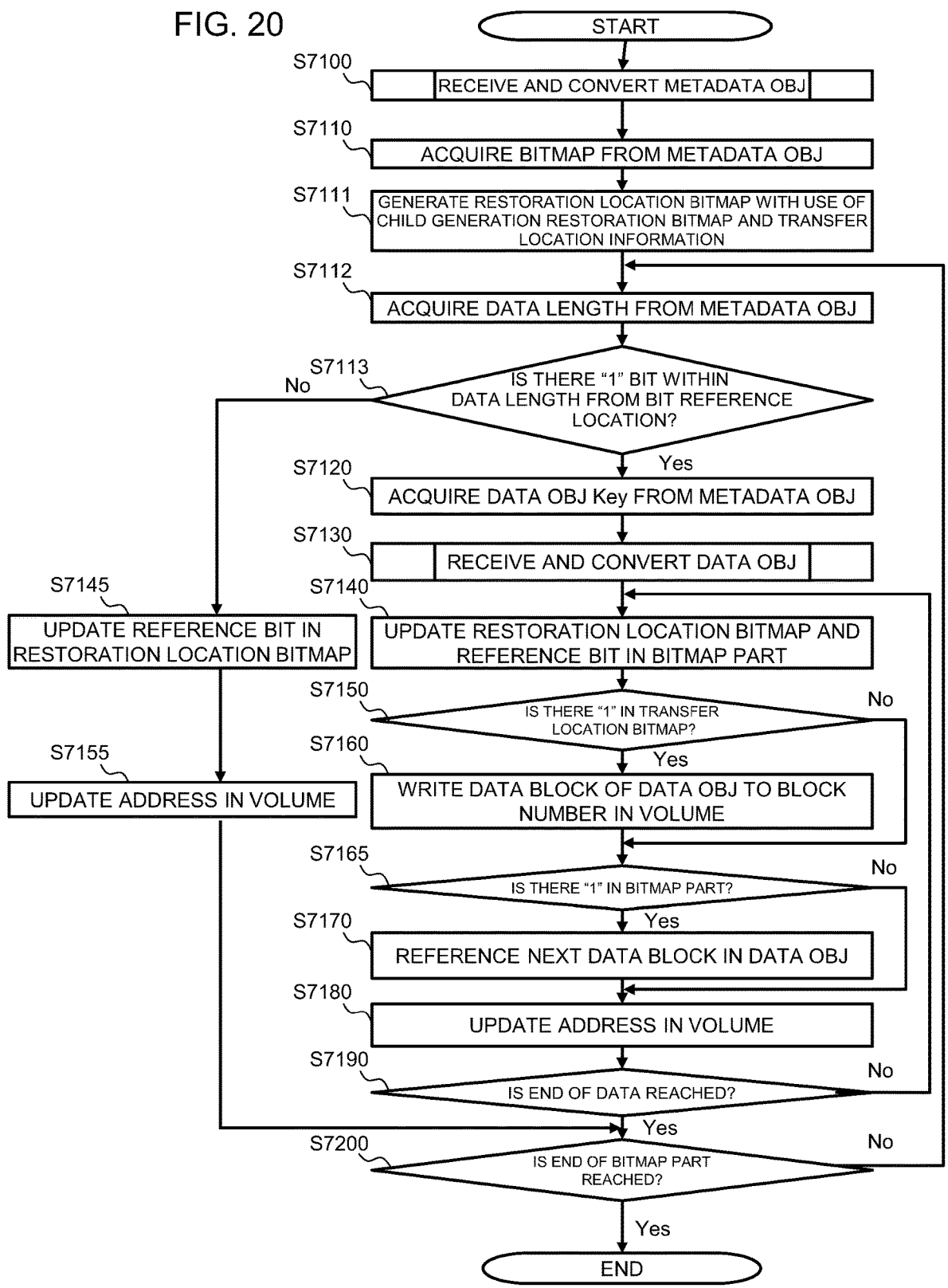
FIG. 20 is a flowchart indicating how a backup data acquisition and restoration process in FIG. 17 is performed by the embodiment of the invention.

FIG. 20 is a flowchart indicating how the backup data acquisition and restoration process in step S6160 in FIG. 17 is performed. In executing this process, the I/O control program P150 interprets the backup data acquired in reference to the metadata and writes the data to the restore destination volume.

First, in reference to the metadata OBJ Key found in the catalog (e.g., T1615 in FIG. 13A), the I/O control program P150 acquires the object of the metadata from the object store (S7100). The I/O control program P150 then clips the bitmap part from the acquired metadata (S7110).

Prior to this process, the metadata OBJ has been received from the target catalog in step S10130 during the transfer location information generation process, and the bitmap has been acquired in step S10140. For this reason, in the case where the data remains unchanged in the buffer of the restoration destination apparatus, either one or both of these processes may be omitted.

Thereafter, the I/O control program P150 acquires a "restoration location bitmap" (S7111) for identifying the storage location of the data to be restored from the target catalog, by use of the transfer location information associated with the target catalog and the child-generation restoration bitmap. Specifically, an AND operation is performed between an inverted child-generation restoration bitmap and the transfer location information. The non-zero portion in the restoration location bitmap represents the storage location of the data to be restored from the transfer list. That is, the transfer location information indicates the data required to be transferred from the cloud while excluding the locally existing data from the transfer target.

Next, the I/O control program P150 obtains data length information (S7112). The I/O control program P150 counts the number of data length units and, upon comparison with the bitmap, determines whether or not the restoration target data is found in the backup data having the same OBJ Key. Specifically, the I/O control program P150 searches through the restoration location bitmap to determine whether non-zero bits are set ahead of the current bit reference location by the number of data length units. If at least one non-zero bit is found to be set, then this is determined to be the data OBJ in which the restoration target data is found.

In the case where the restoration target data is found (S7113: Yes), the I/O control program P150 obtains a first data OBJ Key from the metadata (S7120). The I/O control program P150 acquires the object of the backup data having the same OBJ Key from the object store (S7130).

The I/O control program P150 then restores the data by referencing the restoration location bitmap and each of the bits in the bitmap part.

When the reference bit in the transfer location bitmap is "1" (S7150: Yes), that means the data having the applicable block number exists in the backup data and that the data needs to be restored. Hence, the I/O control program P150 writes the data block included in the backup data to that block number of the restore destination volume (S7160). On the other hand, in the case where the bit is "0" (S7150: No), that means there is no need for restoration from the backup data. The process is then allowed to proceed with nothing performed at this point.

Next, in the case where what is referenced in the bitmap part is "1" (S7165: Yes), that means the data OBJ includes the backup data corresponding to the applicable block number. The reference block is incremented by one in the backup data in preparation for the next step (S7170). On the other hand, in the case where what is referenced in the bitmap part is "0" (S7165: No), the process is allowed to proceed with nothing carried out at this point.

Next, the write destination block number in the restore destination volume is incremented by one (S7180).

If there still exists any reference block in the backup data, i.e., if the data end is not reached yet (S7190: No), the process of block writing is repeated in reference to the bitmap (S7140 through S7170). On the other hand, in the case where the data end is reached (S7190: Yes), a check is made to determine whether there still exists a bit group yet to be referenced in the bitmap, i.e., whether or not the writing to the volume is completed (S7200). If the writing is not completed (S7200: No), the data length is obtained (S7112), and the process of writing is repeated in reference to the bitmap (S7112 through S7190).

In the case where the restoration target data is not found in the data OBJ (S7113: No), the reference bit in the restoration location bitmap is advanced by the data length (S7145). The update address of the volume is also advanced by the data length (S7155).

Thereafter, a check is made to determine whether there still exists a bit group yet to be referenced in the bitmap, i.e., whether the writing to the volume is completed (S7200). In the case where the writing is not completed (S7200: No), the data length is obtained (S7112), and the process of writing is repeated in reference to the bitmap (S7112 through S7190).

In the case where the end of the bitmap is reached (S7200: Yes), that means the writing of all pieces of backup data is completed. The process is then brought to an end.

Figure 21:
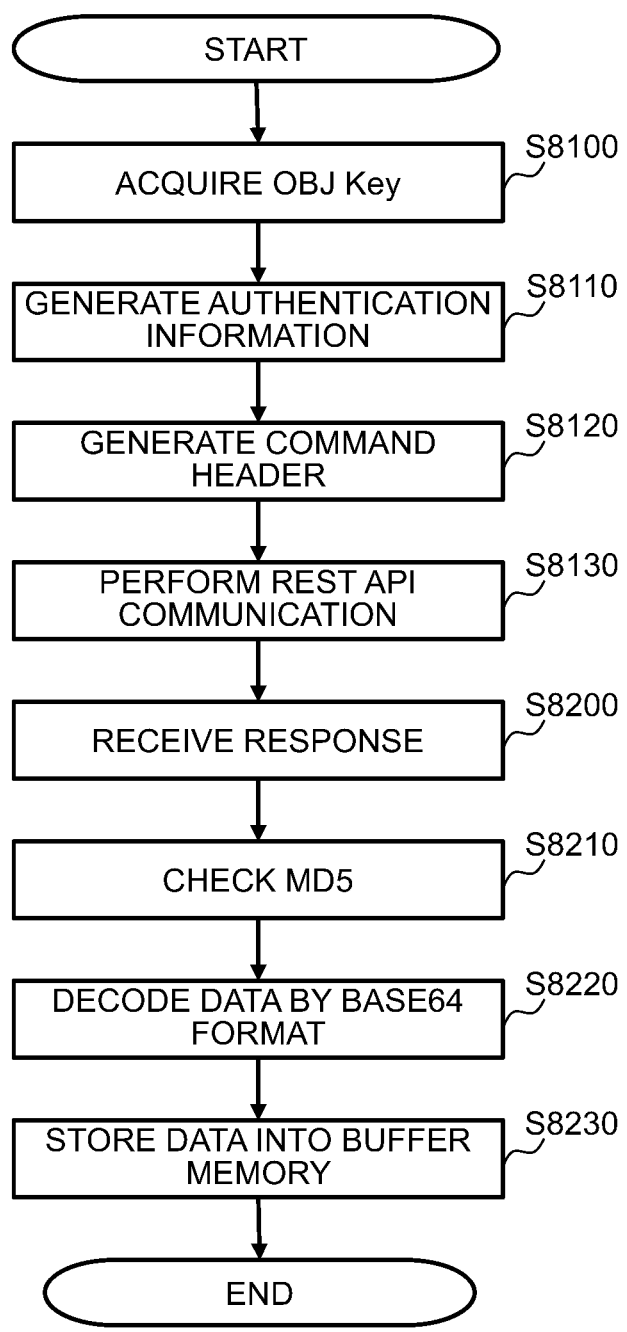
FIG. 21 is a workflow diagram indicating a process performed by the embodiment of the invention and ranging from acquisition of an object from the object store to conversion of the object to obtain binary data having been stored.

FIG. 21 is a workflow diagram indicating the process performed by the I/O control program P150, the process ranging from acquisition of an object from the object store to conversion of the object to obtain binary data having been stored.

The I/O control program P150 acquires an OBJ Key, which is the name of the object (S8100). Then, using the Access ID and the Secret Key from the object store registration information, the I/O control program P150 performs predetermined calculations to generate authentication information (S8110). The I/O control program P150 causes the API communication management function P1536 to configure a GET command with an HTTP header in addition to the authentication information and the date and time of transmission (S8120) and to request the object from the object store by REST API communication (S8130).

The I/O control program P150 receives from the object store a response including the object (S8200), and checks the MD5 of the received data to see if the data has no error (S8210). If the data has no error, the I/O control program P150 decodes the received data by using BASE64 format into binary data (S8220), and copies the binary data to a memory region for data storage (S8230).

FIGS. 22A through 22D depict examples for better understanding of the restore procedure outlined in FIG. 17. For the purpose of simple explanation, the number of data blocks to be stored to one data OBJ is indicated to be one.

Figure 22A:
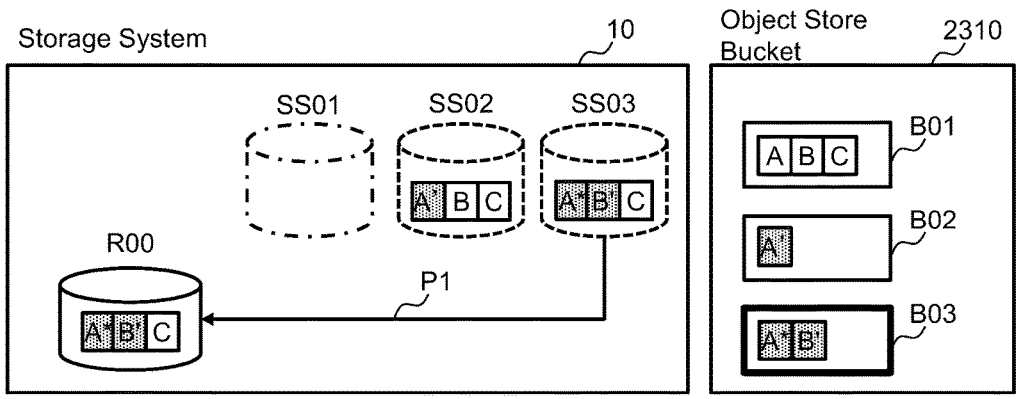
FIGS. 22A and 22D are schematic diagrams depicting an example of the restore procedure performed by the embodiment of the invention.

FIG. 22A indicates a state where snapshots SS02 and SS03 remain in the storage system 10, where the bucket 2310 of the object store includes incremental backups B01, B02, and B03 corresponding to the snapshots, and where the third-generation backup corresponding to B03 is restored to a volume R00 at this point. According to the procedure in FIG. 17, the I/O control program P150 first acquires the catalog data of B03 and verifies the presence of the snapshot corresponding to the acquired catalog data. This reveals SS03 to be available, so that the I/O control program P150 restores the snapshot (P1). Since there is no other catalog registered in the process list, the restore process is brought to an end. As a result, the third-generation backup is verified to be restored to the volume R00.

Figure 22B:
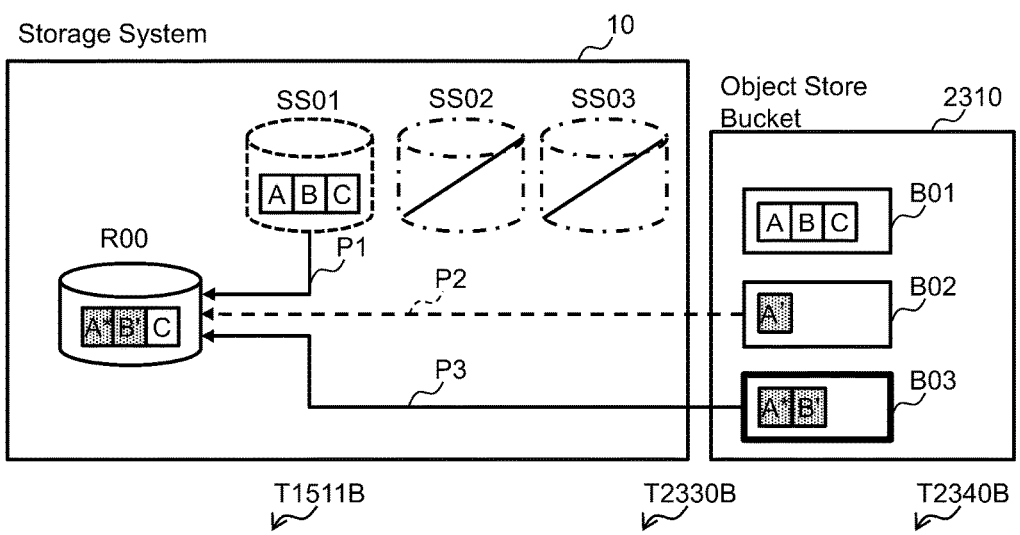

FIG. 22B indicates a state where the snapshots SS02 and SS03 are not available for some reason and where the third-generation backup designated by B03 is restored. According to the procedure in FIG. 17, the snapshot SS03 corresponding to B03 exists but is not available, so that the I/O control program P150 adds the catalog data of B03 to the process list.

Then in B03, there exists the backup B02 making up the parent generation, so that the I/O control program P150 acquires the catalog of B02. In B02, the corresponding snapshot SS02 is not found but there is the backup B01 making up the parent generation, so that the I/O control program P150 acquires the catalog of B01. In B01, there exists the corresponding snapshot SS01 and is available, so that the I/O control program P150 restores the snapshot SS01 to the volume R00 (P1). The I/O control program P150 then transitions to processing the process list.

Since the catalog data of B02 and the catalog data of B03 are registered in the process list, the I/O control program P150 performs the transfer location information generation process. As a result of this, a transfer location information bitmap (T2330B) is made associated with the catalogs of B02 and B03.

Next, the I/O control program P150 performs the child-generation backup data restoration process. Since there exists no backup subsequent to B03, no data is restored from the child generation, and the child-generation restoration bitmap is set with all zeros.

The I/O control program P150 then performs the process of restoring B2 and B3. In the process P2 of restoration from B02, no non-zero bits are found in the transfer location information associated with B02, so that the I/O control program P150 does not perform data transfer. In the process P3 of restoration from B03, there are non-zero bits in the transfer location information associated with B03, so that the I/O control program P150 performs the process of restoring the data in the corresponding storage location. As a result of this, the third-generation backup is confirmed to be restored to the volume R00.

FIG. 22C depicts a state where the third-generation backup corresponding to B03 is restored to a volume R01 in another storage system 10'. According to the procedure in FIG. 17, no snapshot exists in the other storage system 10', so that the catalog data of B03, the catalog data of B02, and the catalog data of B01 are added to the process list, in that order. As in FIG. 22B, the restoration processes P1, P2, and p3 corresponding respectively to the pieces of catalog data are carried out starting from the end of the list. As a result of this, the third-generation backup is confirmed to be restored to the volume R01. In the process P2, as in FIG. 22B, no data transfer is carried out. In this example, the amount of data transfer equals the size of the restored volume capacity, which constitutes the upper limit on the amount of transferred data. In the case where multiple (as many as N) data blocks are to be stored in one data OBJ for the purpose of management information reduction, the upper limit on the amount of data transfer is N times the volume capacity.

FIG. 22D depicts a state where only the snapshot SS03 remains in the storage system 10 and where the second-generation backup corresponding to B02 is restored to the volume R00. According to the procedure in FIG. 17, the I/O control program P150 first acquires the catalog data of B02 and verifies the snapshot corresponding to the acquired catalog data. With the corresponding snapshot SS02 not found, the I/O control program P150 adds the catalog data of B02 to the process list. Then in B02, the backup B01 making up the parent generation is present, so that the I/O control program P150 acquires the catalog of B01. Since the snapshot SS01 corresponding to B01 is also not found, the I/O control program P150 adds the catalog of B01 to the process list. Since the catalogs of B02 and B01 are found in the process list in that order, the I/O control program P150 performs the transfer location information generation process by using the catalog and metadata of B01 at the end of the list, to obtain the respective transfer location information. Next, the I/O control program P150 performs the child-generation backup data restoration process. In B02, the backup of B03 making up the child generation is found present. In B03, there is an available snapshot. Hence, the I/O control program P150 generates a child-generation restoration bitmap for B03 and, in reference to the generated bitmap, performs the process P1 of restoration from the snapshot SS03 to the volume R00. At this point, the data in bitmap location #3 where a "1" bit is set is restored. The I/O control program P150 then performs the restoration processes sequentially starting from the end of the process list.

At this time, in reference to the child-generation restoration bitmap and the transfer location information, the I/O control program P150 transfers only the data in bitmap location #2 in the process P2 and only the data in bitmap location #1 in the process P3. As a result of this, the second-generation backup is confirmed to be restored to the volume R00.

The above-described embodiment operates in such a manner that, by use of the backup source apparatus and snapshot number information included in the catalog data, the snapshots that may be found in the restoration destination storage apparatus are used for data restoration and that only the data valid in the restore destination volume is transferred from the cloud. This makes it possible to shorten the restore time and to reduce the cost of data acquisition from the object store. In the case where the number of backup generations is increased, an upper limit can be set on the amount of data transfer.

Second Embodiment

In the first embodiment above, the object, meta information, and catalog data regarding the backup data are all stored in the object store. In a variation of the first embodiment, a cloud database service may be used to store the catalog data.

In this case, the catalog data is stored as records in a database provided by the database service 220 in FIG. 2.

FIG. 23 depicts a state where the catalog data in the second embodiment is recorded using a NoSQL database provided by the database service 220. It can be recognized that the catalog data indicated in FIGS. 13A and 13B is stored as records.

The second embodiment allows the information regarding the multiple pieces of catalog data to be acquired by use of a single NoSQL command. This eliminates the need for a complicated acquisition flow such as one depicted in FIG. 16, which makes it possible to perform a backup list display process at high speed. Also, there is no need for the process of converting the catalog data to the OBJ in the backup/restore operations.

As described above, the storage system disclosed by use of the embodiments above acquires a snapshot of the volume of interest for each backup, selects a previous snapshot serving as the comparison source, acquires changes or differences relative to the previous snapshot, and extracts the data block targeted to be backed up accordingly.

Also, the storage system integrates multiple extracted target data blocks into an object group; generates the meta information for determining the original storage locations of the data blocks included in the object group; generates the catalog data for holding information regarding the child-parent relation with the previous backup, the backup source apparatus, and the snapshot; and stores the object group, the meta information, and the catalog data into the object store.

At the time of restore, the storage system identifies a series of backup data groups necessary for the restore process in reference to the parent-child relation in the catalog data.

By use of the backup source apparatus and the snapshot information in the catalog data, the storage system determines whether or not the snapshot is found available in the restoration destination apparatus. If the snapshot is available, the storage system uses that snapshot preferentially.

In addition, in reference to the storage location information in the meta information, the storage system identifies the data block which has not been overwritten with data in the child and subsequent generations and which is valid in the restore target volume, and transfers solely the object group including that data block from the cloud. This makes it possible to reduce the amount of data received from the cloud.

The storage system is thus capable of reducing the restore time and the cost of using the cloud service. Since the data blocks to be overwritten at the time of restore and the data found in the backup destination apparatus are not received from the object store, the amount of data transfer is reduced.

Also, according to this storage system, even in the case where the number of backup generations is increased, an upper limit can be set on the amount of data required to be transferred at the time of restore.

It is to be understood that while the invention has been described in conjunction with specific embodiments with reference to the accompanying drawings, it is evident that many alternatives, modifications, and variations will become apparent to those skilled in the art in light of the foregoing description. For example, whereas the above-described embodiments give detailed and comprehensive explanations of this invention, the invention is not limited to any embodiment having all the configurations and components discussed above. Also, any of the above-described configurations or components may be deleted, changed, or supplemented as needed with suitable configurations or components, and the resulting embodiment is still a valid embodiment of the present invention.

What is claimed is:

1. A storage system comprising:
   at least one physical storage device;
   one or more processors that are collectively configured to provide at least one logical volume configured by using a storage region in the at least one physical storage device; and
   at least one network interface configured to connect with a cloud service that provides storage,
   wherein the one or more processors are collectively configured to:
      generate a snapshot of actual data,
      generate snapshot-related catalog information including at least a location for storing the actual data in the snapshot and a reference destination for identifying another snapshot in parent-child relation to the snapshot,
      store the actual data in the snapshot to the at least one physical storage device and/or to the cloud service,
      migrate the actual data of the snapshot to the cloud service in accordance with a specified rule, and
      receive a request to restore a target snapshot; and
   wherein in response to the request to restore the target snapshot, the one or more processors are collectively configured to:
      reference the snapshot-related catalog information to identify a child-generation snapshot of the target snapshot, wherein the actual data of the child-generation snapshot is stored in the storage system;
      reference the snapshot-related catalog information to identify a parent-generation snapshot of the target snapshot, wherein the actual data of the parent-generation snapshot is stored in the cloud service; and
      perform a restoration of the target snapshot by using the child-generation snapshot and the parent-generation snapshot.

2. The storage system according to claim 1,
   wherein the snapshot-related catalog information further includes a reference location that references a respective snapshot generated previous to the snapshot described in the snapshot-related catalog information, wherein in response to the request to restore the target snapshot, the one or more processors are further collectively configured to:

reference a plurality of pieces of the snapshot-related catalog information including the snapshot targeted to be restored, in order to reference the snapshot generated previous to the target snapshot, and use the snapshot referencing the target snapshot and update the snapshot-related catalog information regarding the snapshot generated subsequent to the target snapshot.

3. The storage system according to claim 1, wherein the snapshot of which the actual data is stored in the at least one physical storage device is identified, the snapshot being in the parent-child relation to the target snapshot, the actual data being acquired and used for restoring the target snapshot, and the snapshot of which the actual data is stored not in the at least one physical storage device but in the cloud service is identified, the snapshot being in the parent-child relation to the target snapshot, the actual data being acquired and used for restoring the target snapshot.

4. The storage system according to claim 1, wherein:

when the snapshot is generated, the one or more processors collectively store meta information indicative of an update data location in the snapshot as the location of data updated from a most recent snapshot, and the restoration incudes:

referencing the meta information and the snapshot-related catalog information to extract the location of the data that is valid in a restore destination volume with respect to each of one or a plurality of snapshots to be restored, and selectively transferring data from the cloud service based on the location of the data extracted.

5. The storage system according to claim 4, wherein, if there exists an on-premise snapshot that is previous to the target snapshot targeted and that is stored in the at least one physical storage device, the one or more processors collectively exclude the data found in the on-premise snapshot and valid in the restore destination volume from the data targeted to be transferred from the snapshot in the cloud service.

6. The storage system according to claim 4, wherein, if there exist in the cloud service a plurality of snapshots of which the update data location matches, the one or more processors collectively regard the data in the update data location as valid in the most recent snapshot and as invalid in other snapshots.

7. The storage system according to claim 1, wherein the one or more processors are further collectively configured to:

generate a forward-cumulative bitmap indicating whether the data in each block in a restore destination volume is determined or yet to be determined to be valid, extract, sequentially from a most recent and previous snapshots, the block in an update data location in each respective snapshot to form an extracted block, the extracted block being one in which the data is yet to be determined to be valid in the forward-cumulative bitmap, regard the extracted block as the location of valid data in the snapshot, and perform a process of updating the extracted block into one in which the data is determined to be valid, thereby determining the location of the valid data in each snapshot.

8. A method of restoring a storage system, the method comprising:

generating a snapshot of actual data, generating snapshot-related catalog information including at least a location for storing the actual data in the snapshot and a reference destination for identifying another snapshot in parent-child relation to the snapshot storing the actual data in the snapshot to at least one physical storage device and/or to a cloud service, migrating the actual data of the snapshot to the cloud service in accordance with a specified rule, and receiving a request to restore a target snapshot; and in response to the request:

referencing the snapshot-related catalog information to identify a child-generation snapshot of the target snapshot, wherein the actual data of the child-generation snapshot is stored in the storage system;

referencing the snapshot-related catalog information to identify a parent-generation snapshot of the target snapshot, wherein the actual data of the parent-generation snapshot is stored in the cloud service; and performing a restoration of the target snapshot by using the child-generation snapshot and the parent-generation snapshot.

9. A storage system comprising:

at least one physical storage device;

one or more processors that are collectively configured to provide at least one logical volume configured by using a storage region in the at least one physical storage device; and at least one network interface configured to connect with a cloud service that provides storage, wherein the one or more processors are collectively configured to:

generate a snapshot of actual data, generate snapshot-related catalog information including at least a location for storing the actual data in the snapshot and a reference destination for identifying another snapshot in parent-child relation to the snapshot, store the actual data in the snapshot to the at least one physical storage device and/or to the cloud service, migrate the actual data of the snapshot to the cloud service in accordance with a specified rule, and receive a request to restore a target snapshot; and perform a restoration of the target snapshot in response to the request, wherein the restoration includes:

generating a forward-cumulative bitmap indicating whether the data in each block in a restore destination volume is determined or yet to be determined to be valid, extracting, sequentially from a most recent and previous snapshots, the block in an update data location in each respective snapshot to form an extracted block, the extracted block being one in which the data is yet to be determined to be valid in the forward-cumulative bitmap, regarding the extracted block as the location of valid data in the snapshot, and performing a process of updating the extracted block into one in which the data is determined to be valid, thereby determining the location of the valid data in each snapshot.

* * * * *